United States Patent
Kim et al.

(10) Patent No.: US 11,977,855 B2
(45) Date of Patent: May 7, 2024

(54) SYSTEM AND METHOD FOR AUTOMATIC SPEECH TRANSLATION BASED ON ZERO USER INTERFACE

(71) Applicant: Electronics and Telecommunications Research Institute, Daejeon (KR)

(72) Inventors: Sang Hun Kim, Daejeon (KR); Seung Yun, Daejeon (KR); Min Kyu Lee, Daejeon (KR); Joon Gyu Maeng, Daejeon (KR); Dong Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 17/522,218

(22) Filed: Nov. 9, 2021

(65) Prior Publication Data
US 2022/0147722 A1     May 12, 2022

(30) Foreign Application Priority Data

Nov. 10, 2020   (KR) ........................ 10-2020-0149444
Sep. 2, 2021   (KR) ........................ 10-2021-0117156

(51) Int. Cl.
*G06F 40/58*     (2020.01)
*G10L 17/02*     (2013.01)
(Continued)

(52) U.S. Cl.
CPC ............ *G06F 40/58* (2020.01); *G10L 17/02* (2013.01); *G10L 17/06* (2013.01); *G10L 17/18* (2013.01);
(Continued)

(58) Field of Classification Search
None
See application file for complete search history.

(56) References Cited

U.S. PATENT DOCUMENTS 7,921,018 B2    4/2011   Hong et al.
10,142,730 B1 *   11/2018   Yousefian ............. H04R 3/005
(Continued)

FOREIGN PATENT DOCUMENTS

KR         101559716 B1    10/2015
KR    1020190074012 A    6/2019
(Continued)

OTHER PUBLICATIONS

Meng, Yingjie, et al. "A screening scheme based on energy for speech key-frame." 2017 IEEE 17th International Conference on Communication Technology (ICCT). IEEE, 2017.*
(Continued)

*Primary Examiner* — Paras D Shah
(74) *Attorney, Agent, or Firm* — William Park & Associates Ltd.

(57) ABSTRACT

The Zero User Interface (UI)-based automatic speech translation system and method can solve problems such as the procedural inconvenience of inputting speech signals and the malfunction of speech recognition due to crosstalk when users who speak difference languages have a face-to-face conversation. The system includes an automatic speech translation server, speaker terminals and a counterpart terminal. The automatic speech translation server selects a speech signal of a speaker among multiple speech signals received from speaker terminals connected to an automatic speech translation service and transmits a result of translating the speech signal of the speaker into a target language to a counterpart terminal.

17 Claims, 10 Drawing Sheets

(51) Int. Cl.
*G10L 17/06* (2013.01)
*G10L 17/18* (2013.01)
*G10L 21/0232* (2013.01)
*G10L 21/0316* (2013.01)
*G10L 21/04* (2013.01)
*G10L 25/06* (2013.01)
*G10L 25/18* (2013.01)
*G10L 25/21* (2013.01)
*G10L 25/78* (2013.01)

(52) U.S. Cl.
CPC ...... *G10L 21/0232* (2013.01); *G10L 21/0316* (2013.01); *G10L 21/04* (2013.01); *G10L 25/06* (2013.01); *G10L 25/18* (2013.01); *G10L 25/21* (2013.01); *G10L 25/78* (2013.01)

(56) References Cited

U.S. PATENT DOCUMENTS

| 10,558,763 B2 | 2/2020 | Choi et al. |
| 2015/0127361 A1 | 5/2015 | Shin et al. |
| 2016/0217787 A1* | 7/2016 | Tu .......................... G10L 25/93 |
| 2018/0174600 A1* | 6/2018 | Chaudhuri ....... H04N 21/44008 |
| 2019/0115010 A1* | 4/2019 | Yu ......................... G10L 15/005 |
| 2020/0184954 A1* | 6/2020 | Wolff .................... G01S 3/8006 |
| 2020/0279561 A1* | 9/2020 | Sheeder ................ G06F 3/0346 |

FOREIGN PATENT DOCUMENTS

| KR | 102042247 B1 | 11/2019 |
| KR | 102056330 B1 | 12/2019 |
| KR | 102158739 B1 | 9/2020 |

OTHER PUBLICATIONS

Moattar, Mohammad Hossein, Mohammad M. Homayounpour, and Nima Khademi Kalantari. "A new approach for robust realtime voice activity detection using spectral pattern." 2010 IEEE International Conference on Acoustics, Speech and Signal Processing. IEEE, 2010.*

Translation of WO2015115677A1, Bae M J, published on Aug. 2015.*

Katerina Zmolikova, Far-Field Speech Recognition, BRNO University of Technology, Faculty of Information Technology Department of Computer Graphics and Multimedia, May 25, 2016.

* cited by examiner

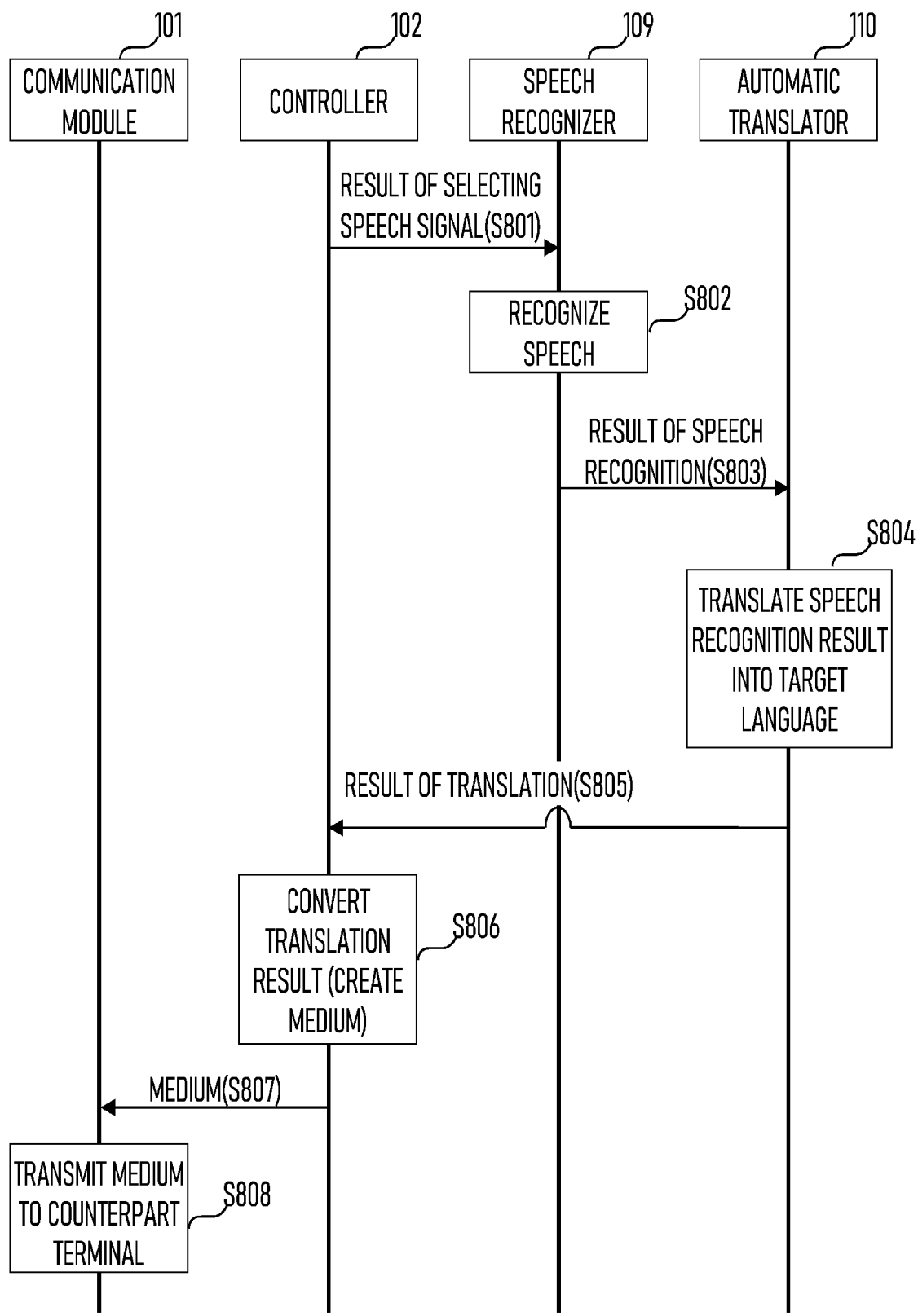

SYSTEM AND METHOD FOR AUTOMATIC SPEECH TRANSLATION BASED ON ZERO USER INTERFACE

CROSS-REFERENCE TO RELATED APPLICATION

This application claims priority to and the benefit of Korean Patent Application No. 10-2020-0149444, filed on Nov. 10, 2020 and 10-2021-0117156, filed on Sep. 2, 2021, the disclosure of which are incorporated herein by reference in its entirety.

BACKGROUND

1. Field of the Invention

The present invention relates to an automatic speech translation system and method based on a Zero User Interface (UI) and, more particularly, to an automatic translation system and method for removing noise using signal features, automatically detecting speech, and outputting a result through speech recognition and automatic translation without needing to determine a speech section through an input such as a touch or a button click on a personal automatic speech translation terminal each time a speaker makes an utterance.

2. Discussion of Related Art

Automatic speech translation technology refers to a technology for converting speech uttered by a speaker in a specific language into another specific language through a process such as speech recognition and automatic translation and outputting the converted speech in subtitles (text), speech, or synthesized sound.

Recently, with the development of speech recognition, automatic translation, and speech synthesis technology, automatic speech translation technology has also been widely spread, and various apps related to automatic speech translation have been released and serviced. In the conventional automatic speech translation technology, when a speaker touches, or clicks a button on, the screen of a personal automatic speech translation terminal (hereinafter referred to as a "speaker terminal") and brings the terminal or a speech input device to his or her mouth to input speech, it is common to automatically translate the speech into a target language and display the translated speech on the screen of a counterpart's automatic speech translation terminal (hereinafter referred to as a "counterpart terminal") or provide the translated speech in a synthesized sound.

According to this scheme, for each utterance, a speaker should repeat an operation of touching or clicking on the screen of a smartphone and bringing the terminal or the speech input device close to the mouth. Most normal conversations are face-to-face conversations, but it is difficult to have a natural conversation according to the above-described method. Also, the biggest problem is a cross-talk phenomenon in which, when a user utters in a short-distance conversation, speech is input not only to a speaker terminal but also to a counterpart terminal or a counterpart's speech input device so that automatic speech translators of both sides operate at the same time. When a bone conduction microphone or an in-ear microphone is used to prevent the crosstalk, there is a problem in that an automatic speech translator may not work stably due to variations in the shape of human faces (the size of the ear hole and the shape of the skin). In addition, when speech is pre-processed using automatic gain control or the like, the original speech may be distorted, which leads to deterioration of speech recognition accuracy and automatic translation performance.

SUMMARY OF THE INVENTION

The present invention is directed to providing a system and method for outputting a speech translation result to a counterpart terminal without touching a screen or clicking on a button with a Zero user interface (UI)-based automatic speech translation service in order to solve the above problems.

An app using conventional speech recognition starts input of speech by touching a screen or clicking a button and ends input of speech by touching a screen or clicking a button in the same way or by automatically detecting the end of the speech.

However, in the case of a conversation in which two or more people participate, the above-described method is not suitable for a natural conversation because an utterance and an understanding between the participants are made in real time and continuously. Also, face-to-face conversations are usually conducted at a short distance, and thus when unintentional automatic speech translation is performed due to a crosstalk phenomenon in which a speaker's speech is simultaneously input to the speaker's input device and the counterpart's input device, this may interfere with a conversation utilizing an automatic speech translation system. That is, conversations using the automatic speech translation system may become unnatural due to the crosstalk phenomenon.

The present invention is directed to providing a system and method for eliminating unnecessary terminal screen touches or button clicks and facilitating automatic speech translation through implementations specialized for real-time processing by receiving speech signals of conversation participants continuously, removing noise using features of the signals, detecting speech sections automatically and accurately, selecting a speech signal of a user who actually utters, translating a speech recognition result automatically, and outputting a result of the automatic translation.

According to an aspect of the present invention, there is provided a Zero User Interface (UI)-based automatic speech translation system including an automatic speech translation server configured to select a speech signal of a speaker from among multiple speech signals received from user terminals connected to an automatic speech translation service and configured to transmit a result of translating the speech signal of the speaker into a target language, a speaker terminal configured to receive the speech signal of the speaker and transmit the speech signal of the speaker to the automatic speech translation server, and a counterpart terminal configured to output the result of the translation in a form of text or voice in the target language.

The automatic speech translation server may correct a time difference occurring between the multiple speech signals through phase-based cross-correlation.

The automatic speech translation server may denoise, through an energy ratio (power level ratio)-based algorithm, the speech signals received from the user terminals.

The automatic speech translation server may detect a section having an actual utterance in a speech signal received from a user terminal using a neural network model. The neural network model may be trained to receive a speech signal and calculate a speech presence probability.

The automatic speech translation server may select the speech signal of the speaker using an energy-based speech signal selection algorithm and a speaker feature vector.

According to an aspect of the present invention, there is provided a Zero User Interface (UI)-based automatic speech translation server including a communication module configured to receive multiple speech signals from user terminals connected to an automatic speech translation service and transmit a result of translating a speech signal of a speaker among the speech signals to a terminal of a user who speaks a target language, a speech recognizer configured to perform speech recognition on the speech signal of the speaker to acquire a speech recognition result, and an automatic translator configured to perform translation on the speech recognition result to acquire a translation result.

The Zero UI-based automatic speech translation server may further include a controller configured to control components of the automatic speech translation server for the automatic speech translation server to perform an automatic speech translation process, a time corrector configured to correct a time difference occurring between the multiple speech signals through phase-based cross-correlation, a denoiser configured to denoise the speech signals corrected through the phase-based cross-correlation through an energy ratio (power level ratio)-based algorithm, an automatic speech detector configured to automatically detect a speech section having an actual utterance in each of the denoised speech signals, a power level difference calculator configured to calculate a difference in a per-frame average energy value of each of the multiple denoised speech signal, a speech signal selector configured to select a speech signal of an actual speaker on the basis of the speech section having the actual utterance and the difference in the per-frame average energy value, and a speaker feature vector extractor configured to extract a speaker feature vector on the basis of the selected speech signal, perform comparison using similarity to a pre-registered speaker feature vector, and verify the speaker.

The time corrector may derive cross-correlation using phase information that is acquirable when the multiple speech signals are expressed using a time-frequency spectrum.

The denoiser may derive a ratio from power spectral density of the multiple speech signals and denoise the corrected speech signal through a denoising algorithm by applying a gain function.

The automatic speech detector may detect a section having an actual utterance in the denoised speech signal using a neural network model. The neural network model may be trained to receive a speech signal and calculate a speech presence probability.

The speech signal selector may calculate the number of actual speech frames from the multiple denoised speech signals on the basis of information on the speech section having the actual utterance and information on the difference in the per-frame average energy value and may select a speech signal of an actual speaker only when the number of actual speech frames is greater than or equal to a predetermined reference.

The speaker feature vector may be a vector of a certain dimension into which a speech signal of an utterance section is converted.

The controller may convert the translation result into at least one of text or voice in a target language. The communication module may transmit a result of the conversion to a terminal of a user who speaks a target language.

According to another aspect of the present invention, there is provided a Zero User Interface (UI)-based automatic speech translation method including operations of receiving multiple speech signals from user terminals that are offered automatic speech translation service, selecting a speech signal of a speaker from among the multiple speech signals according to an energy-based speech signal selection algorithm, acquiring a speech recognition result for the selected speech signal, acquiring a result of translating the speech recognition result into a target language, and transmitting the translation result to a user terminal of a target language.

The Zero UI-based automatic speech translation method may further include, after the operation of receiving multiple speech signals, a time difference correction operation for correcting a time difference between the multiple speech signals through a phase-based cross-correlation, a denoising operation for denoising the multiple corrected speech signals through an energy ratio-based algorithm, an automatic utterance section detection operation for automatically detecting a speech section having an actual utterance in the multiple denoised speech signals, and an operation of calculating a difference in a per-frame average energy value of the multiple denoised speech signals.

The Zero UI-based automatic speech translation method may further include, after the operation of selecting a speech signal of a speaker, an operation of verifying whether the selected speech signal is a target speaker's speech using a speaker feature vector.

The time difference correction operation may be an operation of deriving cross-correlation using phase information that is acquirable when the multiple speech signals are expressed using a time-frequency spectrum.

The denoising operation may be an operation of deriving a ratio from power spectral density of the multiple speech signals and denoising the multiple corrected speech signals through a denoising algorithm by applying a gain function.

The automatic utterance section detection operation may be an operation of detecting a section having an actual utterance in the multiple denoised speech signals using a neural network model trained to receive a speech signal and calculate a speech presence probability.

The operation of selecting a speech signal of a speaker may be an operation of selecting the speech signal of the actual speaker on the basis of the speech section having the actual utterance and the difference in the per-frame average energy value.

BRIEF DESCRIPTION OF THE DRAWINGS

FIG. 10 is a flowchart illustrating a method in which an automatic speech translation server performs speech recognition and automatic speech translation and transmits a final result to a user terminal according to an embodiment of the present invention.

DETAILED DESCRIPTION OF EXEMPLARY EMBODIMENTS

Figure 1:
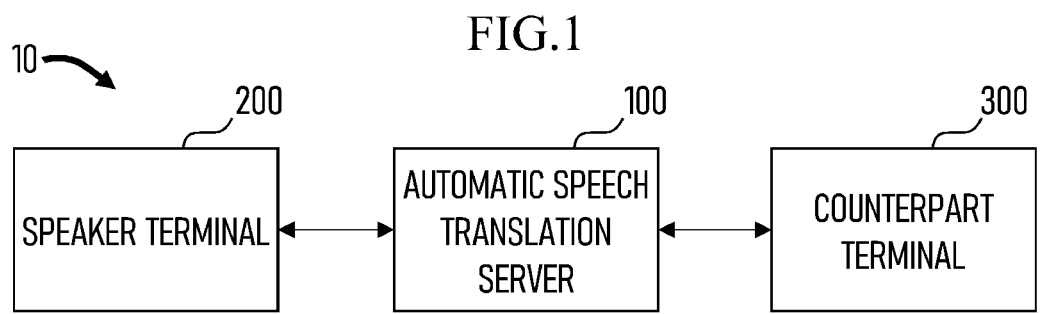
FIG. 1 is a block diagram showing a configuration of a Zero User Interface (UI)-based automatic speech translation system according to an embodiment of the present invention.

Advantages and features of the present invention, and implementation methods thereof will be clarified through the following embodiments described in detail with reference to the accompanying drawings. However, the present invention is not limited to embodiments disclosed herein and may be implemented in various different forms. The embodiments are provided for making the disclosure of the prevention invention thorough and for fully conveying the scope of the present invention to those skilled in the art. It is to be noted that the scope of the present invention is defined by the claims. The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements, steps, operations, and/or components but do not preclude the presence or addition of one or more other elements, steps, operations, and/or components.

In describing the present invention, detailed descriptions of well-known technologies will be omitted when it is determined that they may unnecessarily obscure the gist of the present invention.

Hereinafter, exemplary embodiments of the present invention will be described in detail with reference to the accompanying drawings. In describing the present invention, the same reference numerals will be used for the same means regardless of the reference numerals in order to facilitate the overall understanding.

The present invention relates to a Zero User Interface (UI)-based automatic speech translation system and method.

The present invention provides a system and method for outputting a speech translation result to a counterpart terminal without touching a screen or clicking on a button with a Zero UI-based automatic speech translation service in order to solve the problems described in the [Background] section. A user's natural conversation is possible in an automatic speech translation situation through the operations of an automatic speech translation server 100, a speaker terminal 200, and a counterpart terminal 300 included in a Zero UI-based automatic speech translation system 10 according to an embodiment of the present invention.

FIG. 1 is a block diagram showing a configuration of a Zero UI-based automatic speech translation system 10 according to an embodiment of the present invention.

The Zero UI-based automatic speech translation system 10 according to an embodiment of the present invention may be configured to include a Zero UI-based automatic speech translation server (hereinafter referred to as an "automatic speech translation server") 100, a speaker terminal 200, and a counterpart terminal 300. However, the Zero UI-based automatic speech translation system 10 of the present invention is not limitedly interpreted by FIG. 1 and may be configured differently from that of FIG. 1 according to various embodiments of the present invention.

In the Zero UI-based automatic speech translation system 10 according to an embodiment of the present invention, it is assumed that users may communicate with the automatic speech translation server 100 and a counterpart terminal and may wear or carry a device capable of receiving their speech (i.e., the speaker terminal 200 and the counterpart terminal 300 in FIG. 1). For example, users may wear wearable devices such as earphones or carry smartphones. When they meet each other, a connection between the automatic speech translation server and the users' terminals may be established using a wireless data communication network, and each user may use a Zero UI-based automatic speech translation service.

The automatic speech translation server 100 of the Zero UI-based automatic speech translation system 10 according to an embodiment of the present invention establishes a connection to each user terminal (e.g., the speaker terminal 200, and the counterpart terminal 300) receiving an automatic speech translation service by accepting a connection request from the corresponding user terminal. When the connection between the automatic speech translation server 100 and each user terminal is established, the automatic speech translation server 100 and the corresponding user terminal exchange signals and data to proceed with the automatic speech translation service. The automatic speech translation server 100 starts the automatic speech translation service after pre-registering speaker information. The automatic speech translation server 100 receives multiple speech signals transmitted from each user terminal, corrects a time difference between the multiple speech signals, removes environmental noise from the speech signals, and detects a speech section of each of the speech signals having an actual utterance. In addition, the automatic speech translation server 100 selects a speaker's actual sound signal in the detected speech section, recognizes speech, automatically translates the speech into a target language, and transmits a result of the automatic translation to the user terminal. A user terminal that receives the automatic translation result from the automatic speech translation server 100 may vary depending on the embodiment. For example, the automatic speech translation server 100 may transmit an automatic translation result to all user terminals that receive the automatic speech translation service or may transmit an automatic translation result only to a terminal of a user who utters the target language for translation.

The speaker terminal 200 and the counterpart terminal 300 of the Zero UI-based automatic speech translation system 10 according to an embodiment of the present invention request a connection from the automatic speech translation server 100 in order to be offered the automatic speech translation service by the automatic speech translation server 100. When the automatic speech translation server 100 accepts the connection and the connection is established, the speaker terminal 200 and the counterpart terminal 300 exchange signals and data with the automatic speech translation server 100 in order to be offered the automatic speech translation service. The speaker terminal 200 receives a speaker's speech signal and transmits the speech signal to the automatic speech translation server 100. The speaker terminal 200 and the counterpart terminal 300 receive an automatic translation result for the speech signal from the automatic speech translation server 100 and display the automatic translation result in the form of text (e.g., subtitles) or voice (e.g., pre-recorded voice or synthesized sound) corresponding to a target language of the terminal user.

Meanwhile, FIG. 1 illustrates that two terminals, such as the speaker terminal 200 and the counterpart terminal 300, are connected to the automatic speech translation server 100. However, the number of terminals in the automatic speech translation system 10 according to an embodiment of the present invention is not limited thereto. That is, two or more terminals may be connected to the automatic speech translation server 100.

Although not shown in FIG. 1, in order to receive speech from the speaker terminal 200 and the counterpart terminal 300, a speech input device installed in the terminal to receive speech or an external speech input device such as a wearable device including an earphone may be used.

Although not shown in FIG. 1, since audio pre-processing effects such as automatic gain adjustment and acoustic echo cancellation interfere with providing reliable services, the corresponding functions may be turned off, or a speech input device that does not use the corresponding functions may be used.

Figure 2:
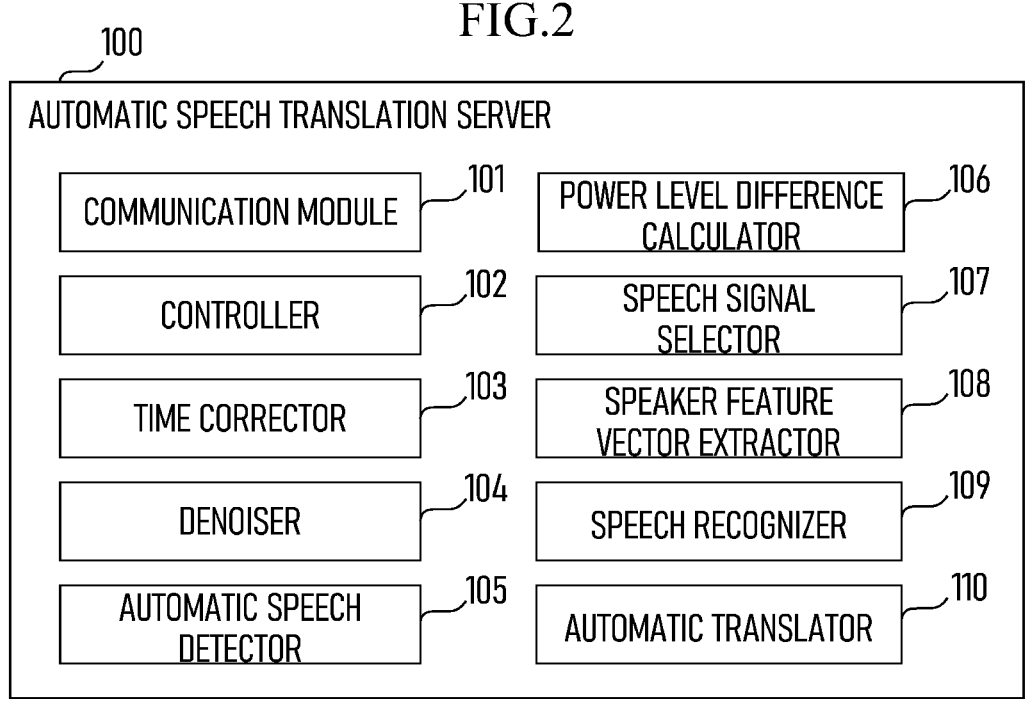
FIG. 2 is a block diagram showing a configuration of an automatic speech translation server according to an embodiment of the present invention.

FIG. 2 is a block diagram showing a configuration of the automatic speech translation server 100 according to an embodiment of the present invention.

As shown in FIG. 2, the automatic speech translation server 100 according to an embodiment of the present invention includes a communication module 101, a controller 102, a time corrector 103, a denoiser 104, an automatic speech detector 105, a power level difference calculator 106, a speech signal selector 107, a speaker feature vector extractor 108, a speech recognizer 109, and an automatic translator 110.

The communication module 101 establishes a connection to each user terminal that receives the automatic speech translation service through the connection request and acceptance process. Also, the communication module 101 receives a speech signal from each user terminal and delivers the speech signal to the controller 102. Also, the communication module 101 transmits a translation result of the speech signal of the speaker or a medium (e.g., subtitles or speech) generated by converting the translation result, which is performed by the controller 102, to each user terminal. A user terminal that receives the automatic translation result or the medium from the automatic speech translation server 100 may vary depending on the embodiment. For example, the communication module 101 may transmit the automatic translation result to all user terminals that receive the automatic speech translation service or may transmit the automatic translation result only to a terminal of a user who utters a target language for translation.

The controller 102 controls components included in the automatic speech translation server 100 to perform an automatic speech translation process of the automatic speech translation server 100. The automatic speech translation process refers to a process performed by the automatic speech translation server 100, including a task of establishing a connection to a user terminal that receives an automatic speech translation service and performing a task of receiving a speech signal from the user terminal and a task of transmitting a translation result to the user terminal. The controller 102 exchanges speech signals, processed speech signals, calculation results, and determination results with other components in the automatic speech translation server 100 as necessary and stores and extracts data in and from a buffer in the automatic speech translation server 100.

The controller 102 may determine the length of a speech signal required for time correction. The controller 102 stores, in the buffer, speech signals acquired by each user terminal that is offered the automatic speech translation service through the communication module 101 and transmits all of the speech signals to a time corrector 103. When the time corrector 103 transmits, to the controller 102, a speech signal in which the time delay of arrival is corrected, the controller 102 stores the corrected speech signal in the speech signal buffer in the automatic speech translation server 100.

The controller 102 transmits the corrected speech signal to the denoiser 104 and receives the denoised speech signal (converted speech signal) from the denoiser 104.

The controller 102 generates a buffer to store an automatic speech detection result generated by the automatic speech detector 105. The buffer is a temporary storage space for the controller 102 to sequentially input speech detection results into the speech recognizer 109.

Also, the controller 102 transmits the denoised speech signal to the automatic speech detector 105. At this time, the controller 102 sets the length of the speech signal transmitted to the automatic speech detector 105 to a length suitable for real-time processing (e.g., 0.1 seconds). When the automatic speech detector 105 transmits, to the controller 102, a result obtained by detecting a starting point and an ending point of speech (a speech section) from the speech signal, the controller 102 stores the automatic speech detection result in the buffer.

The controller 102 transmits the denoised speech signal to the power level difference calculator 106. The controller 102 transmits a speech signal of the length suitable for real-time processing (e.g., 0.1 seconds) to the power level difference calculator 106. The automatic speech detector 105 and the power level difference calculator 106 receive the same speech signal (a speech signal from which noise is removed and to which white noise is added). The power level difference calculator 106 transmits a power level difference calculation result to the controller 102. When the absolute value of the power level difference is smaller than a predetermined threshold (e.g., 0.1), the controller 102 records a corresponding section as a noise section in which only noise is input because no user utters. The automatic speech translation server 100 may acquire terminal information of a user who has actually made an utterance using a power level difference because, among the power levels of the speech signals of the two user terminals, the speaker's speech is input to the speaker terminal 200 at the highest level and is input to the counterpart terminal 300 at a relatively low level.

The controller 102 transmits the results (the speech section and the power level difference information) of the automatic speech detector 105 and the power level difference calculator 106 to the speech signal selector 107. When the speech signal selector 107 determines the speech section as noise, the controller 102 receives the result from the speech signal selector 107. Also, the controller 102 receives a result of the speaker feature vector extractor 108 verifying a speech recognition section.

The controller 102 stores speech signals selected and verified by the speech signal selector 107 and the speaker feature vector extractor 108 in the buffer in the automatic speech translation server 100 so that the speech signals may be sequentially input to the speech recognizer. At this time, the buffer may store a raw speech signal from which noise is removed and to which white noise is added.

The controller 102 transmits the selected speech signal to the speech recognizer 109 and receives a result of translating the selected speech signal from the automatic translator 110.

The controller 102 generates a medium (e.g., subtitles, speech, or synthesized sound) that is easy for the user of the counterpart terminal 300 to understand on the basis of the translation result and delivers the medium to the communication module 101.

In another embodiment of the present invention, the controller 102 delivers the translation result to the communication module 101, and the communication module 101 transmits the translation result to each user terminal. Each user terminal (including the speaker terminal 200 and the counterpart terminal 300) may convert (generate) the translation result into a medium (e.g., subtitles, speech, or synthesized sound) formed in the target language and output the converted translation result.

The time corrector 103 corrects a time difference (time delay) between the speech signals transmitted from the terminals. There are various causes of the time difference between the speech signals. For example, in a face-to-face conversation, a speaker's speech is input to both of the speaker terminal 200 and the counterpart terminal 300 and transmitted to the automatic speech translation server 100. When the distance between the speaker and the speaker terminal 200 is different from the distance between the speaker and the counterpart terminal 300, the times at which the speech arrives at the two terminals are different from each other. In this case, in order to process a plurality of speech signals transmitted from the terminals to the automatic speech translation server 100, it is necessary to correct the time delay of arrival of the speech signals (time difference between the speech signals). Also, the time corrector 103 may correct a time difference between speech signals due to delay in processing the speech signals of the automatic speech translation system.

The time corrector 103 receives a speech signal acquired by each terminal from the controller 102. The time corrector 103 transmits, to the controller 102, a speech signal in which the time delay of arrival is corrected through a predetermined procedure. Speech signals input through a speech input device possessed by any user are corrected using the time corrector 103.

The time corrector 103 performs a Fourier transform on a speech signal received from the controller 102 and acquires speech signal features (e.g., spectrum). Also, the time corrector 103 computes a correlation using the phase of the spectrum (generalized cross-correlation phase transform (GCC-PHAT)). Also, the time corrector 103 finds a point (offset) showing the greatest correlation in the GCC-PHAT and then compensates for the time delay of arrival occurring between two or more signals using the corresponding information. That is, the time corrector 103 derives a cross-correlation based on phase information that may be acquired when a speech signal is expressed as a time-frequency spectrum and corrects a time difference occurring between user terminals using the cross-correlation. The time-delay-of-arrival compensation method using the GCC-PHAT is one of the time correction methods that the time corrector 103 may use. In the present invention, a time correction method that the time corrector 103 uses is not limited thereto, and there may be various methods.

The time corrector 103 transmits the corrected speech signal to the controller 102. The controller 102 stores the corrected speech signal in a speech signal buffer in the server.

In the automatic speech translation method according to an embodiment of the present invention, time delay correction is performed before noise is removed. That is, the speech signal transmitted from the controller 102 to the denoiser 104 is a speech signal of which a delay time of arrival is corrected using the time corrector 103. The reason the time delay correction is performed before denoising is that accurate time correction may not be performed after denoising because the denoising distorts raw speech signal data. Also, a power level ratio (hereinafter referred to as "PLR") and a power level difference (hereinafter referred to as "PLD") have the highest reliability when the speech signals of all the users represent the same time.

The denoiser 104 removes environmental noise present in a speech signal. The denoiser 104 removes noise through an energy ratio-based algorithm for speech signals. The energy ratio-based algorithm is an algorithm for removing noise by deriving a ratio from the power spectral density of two speech signals and by defining and applying a denoising function. The denoiser 104 according to an embodiment of the present invention, which is a PLR-based denoiser, removes noise using two channels. The denoiser 104 extracts a feature value (e.g., spectrum) of an input speech signal using a Fourier transform, calculates a PLR, and then derives a denoising function using the PLR. The denoiser 104 acquires a denoised speech spectrum using the denoising function and the feature value (e.g., spectrum) of the speech signal.

The denoiser 104 receives a corrected speech signal from the controller 102 and transmits a denoised speech signal (converted speech signal) to the controller 102.

The denoising function (gain function) defined through the denoising process of the denoiser 104 has adjustable parameters.

The denoiser 104 receives a speech signal from the controller 102. When the speech signal does not have a length suitable for real-time speech processing (e.g., 0.1 seconds), the denoiser 104 receives another speech signal from the controller 102.

The denoiser 104 extracts a feature value (e.g., spectrum) for an input speech signal using a Fourier transform. Also, the denoiser 104 calculates a PLR and derives a denoising function using the PLR. Also, the denoiser 104 acquires a denoised speech spectrum using the denoising function and the speech spectrum.

The denoiser 104 adds white noise to the denoised speech signal feature and then performs conversion into a speech signal using an inverse Fourier transform and overlap-and-add.

The addition of white noise during the denoising process performed by the denoiser 104 is to induce the automatic speech detector 105 to clearly identify speech by adding weaker white noise to a stronger speech section signal remaining after the denoising and adding stronger white noise to a weaker speech section signal. White noise is added regardless of a non-speech section and a speech section, but it is important to add white noise to the non-speech section for speech identification. There may be various methods for the denoiser 104 to induce the automatic speech detector 105 to reliably identify speech. The above-described method is only one of the embodiments of the present invention.

The denoiser 104 transmits a denoised speech signal (converted speech signal) to the controller 102.

The automatic speech detector 105 automatically detects a starting point and an ending point of an actually uttered speech from the speech signal according to a predefined rule. That is, the automatic speech detector 105 detects a section having an actual utterance in speech uttered by a speaker in a source language. The automatic speech detector 105 computes a speech presence probability and detects a starting point and an ending point of speech by substituting the computed speech presence probability into a predefined rule (ending point detection, hereinafter referred to as "EPD"). A function of the automatic speech detector 105 analyzing a speech signal and computing a speech presence probability may be implemented by an energy-based speech detection engine, an engine pre-trained with a neural network, etc., but the present invention is not limited thereto.

The automatic speech detector 105 uses a parameter called "Prob" (probability value) to detect a starting point and an ending point of speech. In order to automatically detect a speech section, Prob may be calculated by weighted-averaging a speech presence probability acquired at a specific frame of the speech signal and the previous Prob values. That is, Prob is a parameter in which the cumulative average of the voice presence probabilities is stored.

Also, the automatic speech detector 105 receives the denoised speech signal from the controller 102. In this case, the length of the speech signal transmitted to the automatic speech detector 105 is set to a length (e.g., 0.1 seconds) suitable for real-time processing. In this embodiment, the method of automatically detecting speech in units of 0.1 seconds is illustrated, but the present invention is not limited thereto. Meanwhile, the speech signal received by the automatic speech detector 105 from the controller 102 is a speech signal from which noise is removed and to which white noise is added.

The automatic speech detector 105 inputs the received speech signal to a pre-trained machine learning-based speech detection model, calculates speech presence probabilities, and accumulates the speech presence probabilities in the Prob value.

When the Prob value is greater than a preset speech starting point threshold (e.g., 60% or 80%), the automatic speech detector 105 records a speech starting point. When the Prob value is smaller than a preset speech ending point threshold (e.g., 20% or 40%), the automatic speech detector 105 records a speech ending point. The speech starting point threshold and the speech ending point threshold are not limited to the exemplified values and may have different values.

In another embodiment of the present invention, even when the Prob value becomes smaller than the predetermined speech ending point threshold, the automatic speech detector 105 may record the point as a checkpoint instead of directly recording the point as a speech ending point. In this case, the automatic speech detector 105 detects a speech ending point by checking whether an utterance has ended for a certain period of time (e.g., 20 frames) after the checkpoint. As the method of checking whether the utterance has ended, a method of checking whether speech is detected for a certain time of period, a method of checking whether there is a prolonged silence, or the like may be used, but the present invention is not limited thereto.

In an embodiment of the present invention, a speech detection model that the automatic speech detector 105 uses is a model pre-trained with machine learning, but the present invention is not limited thereto. Various types of speech detection models may be applied to the automatic speech detector 105 according to future performance improvement.

When the automatic speech detector 105 transmits, to the controller 102, a result obtained by detecting a starting point and an ending point of an actually uttered speech from the speech signal, the controller 102 stores an automatic speech detection result in the buffer.

Since the automatic speech detector 105 automatically determines an actually uttered speech section, a user can have a natural conversation without any inconvenience caused by a screen touch and a button click.

The automatic speech translation server 100 may use the automatic speech detector 105, the power level difference calculator 106, and the speaker feature vector extractor 108 in order to select speech signals.

The automatic speech detector 105 and the power level difference calculator 106, which will be described below, may operate in parallel. For example, the automatic speech detector 105 and the power level difference calculator 106 may operate simultaneously.

The power level difference calculator 106 extracts energy values from a plurality of speech signals so that the automatic speech translation server 100 can acquire terminal information of a user who has actually uttered speech from the speech signal, and performs a function of computing a difference in a per-frame average energy value.

The power level difference calculator 106 receives the denoised speech signal from the controller 102. The automatic speech detector 105 and the power level difference calculator 106 receive a speech signal of a length suitable for real-time processing from the controller 102, as described above. The automatic speech detector 105 and the power level difference calculator 106 receive the same speech signal (a speech signal from which noise is removed and to which white noise is added).

The power level difference calculator 106 extracts speech signal feature values and power spectral density from the denoised speech signal. In addition, the power level difference calculator 106 calculates the weighted sum of the speech signal feature values and the power spectral density and stores the weighted sum in the buffer. Also, the power level difference calculator 106 calculates a difference in a per-frame average using the weighted sum stored in the buffer and then stores the difference in the buffer.

When the absolute value of the power level difference is smaller than a predetermined threshold (e.g., 0.1), the controller 102 records a corresponding section as a noise section in which only noise is input because no user makes an utterance. Also, the automatic speech translation server 100 may acquire terminal information of a user who has actually made an utterance using a difference in power level because, among the power levels of the speech signals of the two users, the speaker's speech is input to the speaker terminal 200 at the highest level and is input to the counterpart terminal 300 at a relatively low level.

The power level difference calculator 106 transmits the power level difference calculation result to the controller 102.

The automatic speech translation server 100 may use the automatic speech detector 105, the power level difference calculator 106, and the speaker feature vector extractor 108 in order to select speech signals. In this case, the automatic speech detector 105 and the power level difference calculator 106 may operate in parallel. For example, the automatic speech detector 105 and the power level difference calculator 106 may operate simultaneously.

The speech signal selector 107 determines speech signal data and information on a user who has actually made an utterance using a PLD. That is, the speech signal selector 107 selects a signal having the largest energy from among speech signals transmitted to a server on the basis of the PLD (an energy-based speech signal selection algorithm). The energy-based speech signal selection algorithm is an algorithm for extracting an energy value from each speech signal and selecting a speech signal to which an utterance is actually input from among the speech signals using a difference between the energy values. The speech signal selector 107 can identify that speech has been input to the speaker terminal 200, thus allowing an automatic translation service to operate robustly, unlike a conventional automatic speech translation technique that causes a malfunction due to a crosstalk phenomenon in which a user's speech is input to the speaker terminal 200 and the counterpart terminal 300 at the same time.

The speech signal selector 107 receives the power level difference information and the speech section of the speech signal from the controller 102.

The speech signal selector 107 calculates the number of actual speech frames in each section using the speech section information and the power level difference information.

The speech signal selector 107 determines whether the number of speech frames is greater than or equal to a predetermined reference. If the number of speech frames is less than the predetermined reference, the speech signal selector 107 determines a corresponding section as noise for the reason that no real meaningful speech signals are included in the speech section. The speech signal selector 107 transmits a result of the determination to the controller 102. When the number of speech frames is greater than or equal to a predetermined reference, the speech signal selector 107 executes a speech signal determination (selection) algorithm. The speech signal determination algorithm may be an algorithm for selecting a signal with the largest energy from among speech signals input to the speech signal selector 107 using the difference in power level between the input speech signals.

Using the above-described method, it is possible to select one channel with the largest energy from among several channels input for one utterance in a crosstalk situation. In general, an utterance is input to the speaker's speech input device at the highest level, and thus the channel selected in the above-described method is the speaker's speech signal. Accordingly, it is possible to solve the crosstalk problem in the above method.

The speech signal selector 107 transmits a speech signal selection result to the speaker feature vector extractor 108.

The speaker feature vector extractor 108 extracts a speaker feature vector on the basis of a speech signal selected by the speech signal selector 107, calculates the similarity to a pre-registered speaker feature vector, and verifies a conversation participant signal. That is, the speaker feature vector extractor 108 verifies whether the speech signal selected by the speech signal selector 107 is a speaker's speech signal corresponding to the pre-registered speaker feature vector.

The speaker feature vector extractor 108 receives a speech signal selection result from the speech signal selector 107.

The speaker feature vector extractor 108 extracts a speaker feature vector on the basis of the selected speech signal, verifies a conversation participant signal by calculating the similarity to the pre-registered speaker feature vector, and filters out signals other than the conversation participant signal. Here, the speaker feature vector refers to a numerical vector of a certain dimension into which a speech signal in a given actual utterance section is converted.

The speaker feature vector extractor 108 transmits a verification result for the speech recognition section to the controller 102.

The speech recognizer 109 performs a function of interpreting the selected speech signal and converting the interpreted speech signal into text data (a speech recognition function). That is, a meaning is acquired based on the speech signal.

The controller 102 stores speech signals selected and verified by the speech signal selector 107 and the speaker feature vector extractor 108 in the buffer in the automatic speech translation server 100 so that the speech signals may be sequentially input to the speech recognizer. At this time, the buffer may store a raw speech signal from which noise is removed and to which white noise is added.

The speech recognizer 109 receives the speech signal selected and verified by the controller 102.

Also, the speech recognizer 109 performs speech recognition by inputting the selected speech signal to a pre-trained model.

Also, the speech recognizer 109 transmits a speech recognition result to the automatic translator 110.

The automatic translator 110 automatically translates the speech recognition result into a target language.

The automatic speech translation server 100 according to an embodiment of the present invention treats the speech recognizer 109 and the automatic translator 110 as separate components, but according to another embodiment of the present invention, the speech recognizer 109 and the automatic translator 110 may be replaced with an end-to-end automatic speech translator that integrally performs voice recognition and automatic translation functions.

The automatic translator 110 receives the speech recognition result from the speech recognizer 109.

Also, the automatic translator 110 translates the speech recognition result into a target language of a counterpart that is set for the counterpart terminal 300.

Also, the automatic translator 110 transmits a translation result to the controller 102. The controller 102 converts the translation result into a medium (e.g., subtitles or speech) that is easy for the user of the counterpart terminal 300 to understand and delivers the medium to the communication module 101. The communication module 101 may transmit the medium to each terminal. It is sufficient that the medium is a medium in which the counterpart user can grasp the intention of the speaker.

In another embodiment of the present invention, the controller 102 may deliver the translation result to the communication module 101, and the communication module 101 may transmit the translation result to each terminal.

Figure 3:
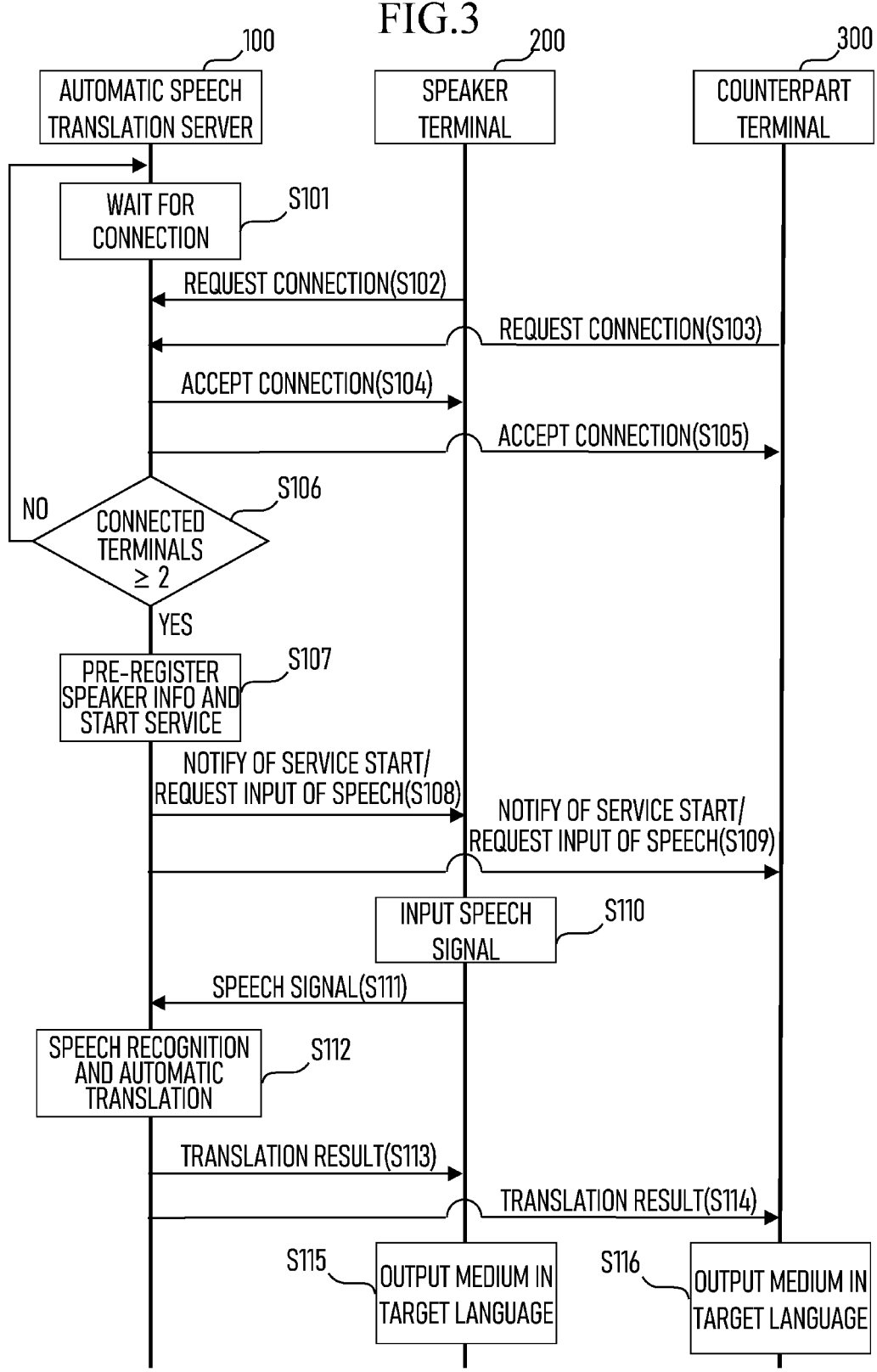
FIG. 3 is a flowchart illustrating an automatic speech translation method of a Zero UI-based automatic speech translation system according to an embodiment of the present invention.

FIG. 3 is a flowchart illustrating an automatic speech translation method of a Zero UI-based automatic speech translation system 10 according to an embodiment of the present invention. Although only a speaker terminal 200 and a counterpart terminal 300 are illustrated in FIG. 3, an additional terminal connected to a server may be included.

In operation S101, an automatic speech translation server 100 waits for a connection request from each terminal that receives an automatic speech translation service.

In operations S102 and S103, a request for connection to an automatic speech translation system server is transmitted from each terminal (hereinafter referred to as the speaker terminal 200 and the counterpart terminal 300 in FIG. 3).

In operations S104 and S105, when the automatic speech translation server 100 accepts the connection request, each terminal connects to the automatic speech translation server 100.

In operation S106, when the number of terminals connected to the automatic speech translation server 100 is less than two, the automatic speech translation server 100 may refuse to start the service and may return to operation S101 and wait for an additional terminal connection.

In operation S107, the automatic speech translation server 100 may perform a pre-registration procedure in order to extract a speaker feature vector of a conversation participant before the service is started. The pre-registration procedure is a process of extracting a speaker feature vector of a speaker through several utterances before the automatic speech translation service is started. The automatic speech translation server 100 starts the automatic speech translation service when the speaker feature vector of the speaker is extracted.

In operations S108 and S109, the automatic speech translation server 100 notifies each terminal of the start of the automatic speech translation service and requests a speech input.

In operation S110, the speaker terminal 200 receives a user's speech signal.

In operation S111, the speaker terminal 200 transmits the user's (speaker's) speech signal to the automatic speech translation server 100.

In operation S112, the automatic speech translation server 100 processes the received speech signal and performs speech recognition and automatic translation. That is, the automatic speech translation server 100 acquires a speech recognition result and an automatic translation result by using the user's (speaker's) speech signal.

In operations S113 and S114, the server transmits the automatic translation result to the speaker terminal 200 and the counterpart terminal 300.

In operation S115, the speaker terminal 200 may convert the result received from the automatic speech translation server 100 into a medium in the target language and output the medium, and the speaker may check whether automatic speech translation is performed well through the medium. Examples of the medium include subtitles, speech, or synthesized sound.

In operation S116, the counterpart terminal 300 converts the result received from the automatic speech translation server 100 into a medium in a language of the user of the counterpart terminal 300 (target language) and outputs the medium. Examples of the medium include subtitles, speech, or synthesized sound.

Although not shown in FIG. 3, when speech is input to the speaker terminal in operation S110, the speech may also be input to the counterpart terminal.

In the present invention, 'the processing of speech' includes processing speech data of a user utterance into a form that can be input to the time corrector 103, the denoiser 104, the automatic speech detector 105, the power level difference calculator 106, the speech signal selector 107, the speaker feature vector extractor 108, the speech recognizer 109, and the automatic translator 110, which are components of the automatic speech translation server 100.

Figure 4:
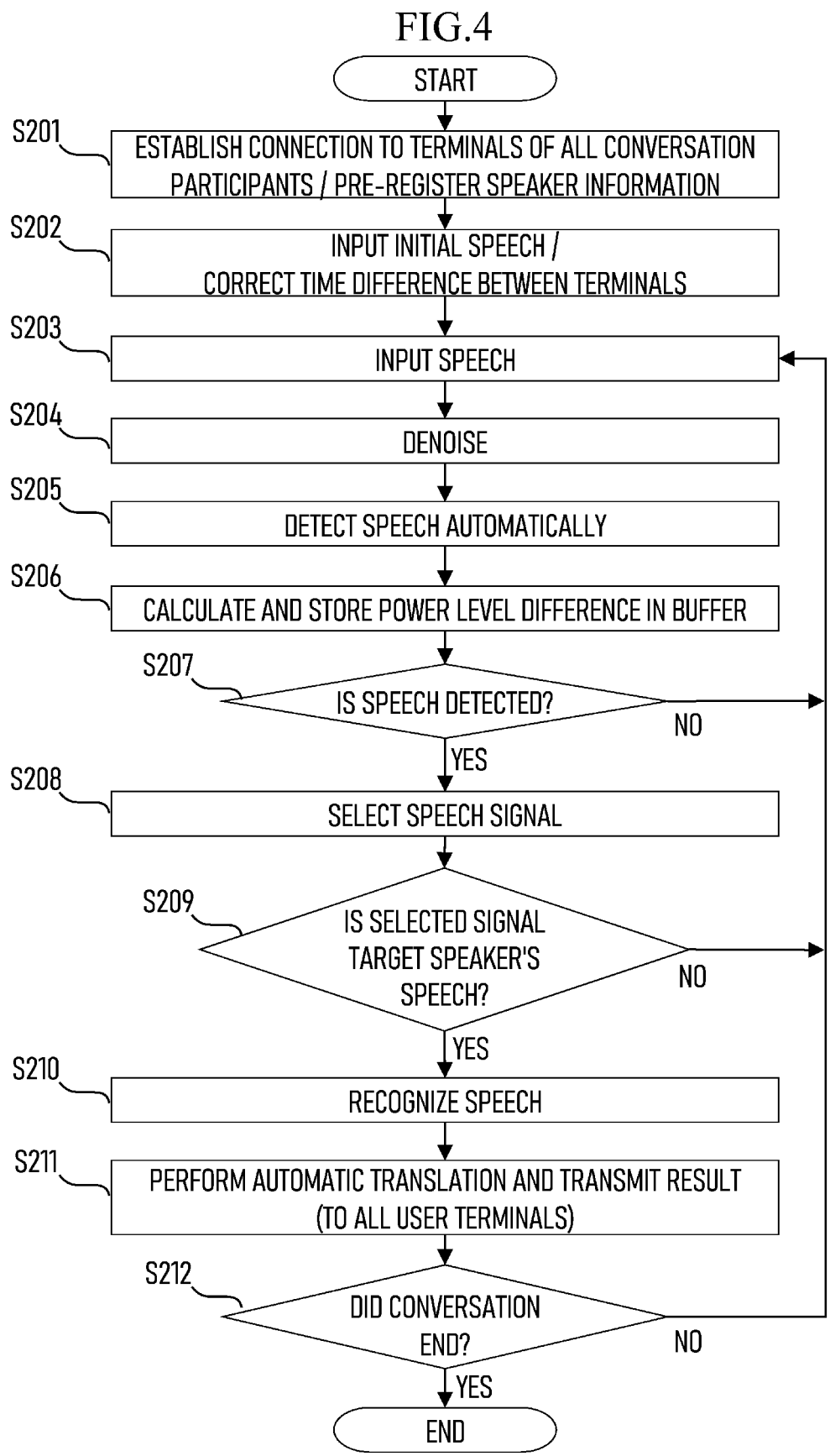
FIG. 4 is a flowchart illustrating an automatic speech translation service provision method performed by an automatic speech translation server according to an embodiment of the present invention.

FIG. 4 is a flowchart illustrating an automatic speech translation service provision method performed by the automatic speech translation server 100 according to an embodiment of the present invention.

In operation S201, when the automatic speech translation server 100 is connected to any user terminal, the automatic speech translation server 100 starts a Zero UI-based automatic speech translation service through mutual agreement. A process in which the automatic speech translation server 100 pre-registers speaker information is the same as in operation S107.

In operation S202, each user terminal receives speech and transmits the speech to the automatic speech translation server 100. Speech signals input through a speech input device possessed by any user are corrected using the time corrector 103. The time corrector 103 corrects a time difference between terminals. In this case, the time difference occurring between the user terminals may be corrected through phase-based cross-correlation. That is, a time difference occurs between multiple speech signals transmitted from the user terminals, and the time difference may be corrected through phase-based cross-correlation.

In operation S203, the automatic speech translation server 100 receives a speech signal from each user terminal at predetermined intervals (e.g., every 0.1 seconds) to process the speech signal in real time and then performs the automatic speech translation service. In the present invention, it has been exemplified that a speech signal is input every 0.1 seconds for real-time speech signal processing, but the present invention is not limited thereto.

Although not shown in FIG. 4, the speech signal received from each user terminal may have noise corresponding to an environment in which the user is located (environmental noise). In operation S204, the automatic speech translation server 100 removes the environmental noise from the speech signal using the denoiser 104. The denoiser 104 removes noise from a speech signal through an energy ratio-based algorithm of speech signals. The energy ratio-based algorithm is an algorithm for removing noise by deriving a ratio from the power spectral density of two speech signals and by defining and applying a denoising function. The denoiser 104, which is a PLR-based denoiser, removes noise using two channels. The denoiser 104 extracts a feature value (e.g., spectrum) of an input speech signal using a Fourier transform, calculates a PLR, and then derives a denoising function using the PLR. The denoiser 104 acquires a denoised speech spectrum using the denoising function and the feature value (e.g., spectrum) of the speech signal.

In operation S205, the automatic speech translation server 100 computes a speech presence probability using the automatic speech detector 105 and detects a starting point and an ending point of speech by substituting the computed speech presence probability into a predefined rule (end point detection, hereinafter referred to as "EPD"). That is, the automatic speech detector 105 detects a section having an actual utterance in speech uttered by a speaker in a source language. A function of the automatic speech detector 105 analyzing a speech signal and computing a speech presence probability may be implemented by an energy-based speech detection engine, an engine pre-trained with a neural network, etc., but the present invention is not limited thereto.

In operation S206, the automatic speech translation server 100 acquires the power spectral density (hereinafter referred to as "PSD") of two input speech signals. Also, the automatic speech translation server 100 computes the power level difference (hereinafter referred to as "PLD") between speech signals of a corresponding frame and stores the PLD in a buffer.

In operation S207, the automatic speech translation server 100 determines whether EPD is made. When no speech is detected, the processing proceeds to operation S203, and the automatic speech translation server 100 performs the subsequent process again. When speech is detected, the processing proceeds to operation S208.

In operation S208, the speech signal selector 107 of the automatic speech translation server 100 selects a signal having the largest energy from among the speech signals transmitted to the automatic speech translation server 100 on the basis of the PLD (an energy-based speech signal selection algorithm). That is, the speech signal selector 107 determines speech signal data and information on a user who has actually made an utterance using the PLD. The energy-based speech signal selection algorithm is an algorithm for extracting an energy value from each speech signal and selecting a speech signal to which an utterance is actually input from among the speech signals using a difference between the energy values. In operation S208, the speech signal selector 107 can identify that speech has been input to the speaker terminal 200, thus allowing an automatic translation service to operate robustly, unlike a conventional automatic speech translation technique that causes a malfunction due to a crosstalk phenomenon in which a user's speech is input to the speaker terminal 200 and the counterpart terminal 300 at the same time.

In operation S209, the automatic speech translation server 100 verifies whether the selected signal is a target speaker's speech. The automatic speech translation server 100 may extract a speaker feature vector from the selected speech signal and verify whether the selected signal is the target speaker's speech by performing comparison using similarity to a pre-registered speaker feature vector. When the selected signal is the target speaker's speech, the automatic speech translation server 100 performs operation S210. When the selected signal is not the target speaker's speech, the processing proceeds to operation S203, and the automatic speech translation server 100 performs the subsequent process again. Here, the speaker feature vector refers to a numerical vector of a certain dimension into which a speech signal in a given actual utterance section is converted.

In operation S210, the selected speech signal data is input to the speech recognizer 109 to acquire a speech recognition result. That is, a meaning is acquired based on the speech signal data.

In operation S211, the automatic translator 110 of the automatic speech translation server 100 automatically translates the acquired speech recognition result into a counterpart's target language. The automatic speech translation server 100 may convert the automatic translation result into a medium (e.g., subtitles or speech) that can be understood by the counterpart and transmits the medium to the counterpart terminal 300, allowing the counterpart to confirm the medium. It is sufficient that the medium is a medium in which the counterpart user can grasp the intention of the speaker.

Although not shown in FIG. 4, the end-to-end speech recognizer used in operation S210 and the automatic translator used in operation S211 have models pre-trained with machine learning, and each machine learning model used in each operation may be different from the model used in this embodiment depending on the performance improvement in the future. The implementations of the speech recognition engine and the automatic translation engine are not limited to machine learning.

Also, the speech recognizer 109 and the automatic translator 110 are illustrated as being separate in FIGS. 4 and 10 but may be integrated into one. That is, the speech recognition process and the automatic translation process may be integrated into one process. A form in which the speech recognizer 109 and the automatic translator 110 are integrated into one is called "end-to-end automatic speech translation." It will be appreciated that the present invention is applicable to an end-to-end automatic speech translator.

In operation S212, when the conversation is no longer continued, the Zero UI-based automatic speech translation service may be terminated under mutual agreement. When the conversation continues, the processing proceeds to operation S203, and the above-described process is performed again.

Figure 5:
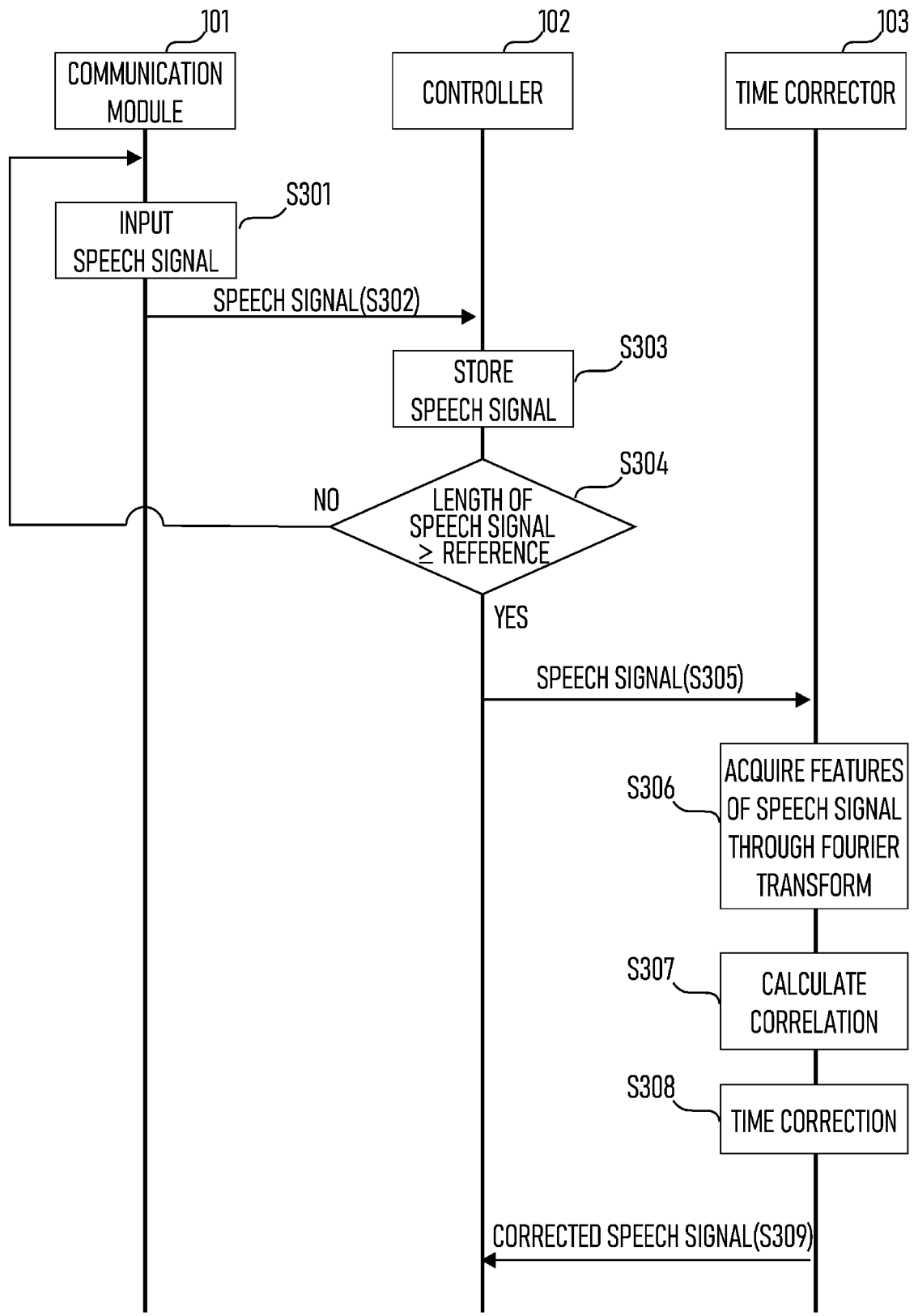
FIG. 5 is a flowchart illustrating a method in which an automatic speech translation server corrects a time difference between speech signals according to an embodiment of the present invention.

FIG. 5 is a flowchart illustrating a method in which the automatic speech translation server 100 corrects a time difference between speech signals according to an embodiment of the present invention.

The controller 102 of the automatic speech translation server 100 may set the length of a speech signal required for time correction. In operation S301, the communication module 101 of the automatic speech translation server 100 receives a speech signal from each terminal that receives an automatic translation service.

In operation S302, the communication module 101 delivers the received speech signal to the controller 102.

In operation S303, the controller 102 stores, in a buffer, the speech signal received by the communication module 101 from each terminal.

In operation S304, the automatic speech translation server 100 checks whether the length of the speech signal exceeds or equals to a predefined reference (e.g., 0.5 seconds). When the length is less than the predefined reference, the processing proceeds to operation S301, and the automatic speech translation server 100 receives the speech signal. When the length of the speech signal exceeds or equals to the reference, the processing proceeds with operation S305.

In operation S305, the controller 102 transmits speech signals of all the users (a speech signal input to each terminal or to speech input device connected to the corresponding terminal) to the time corrector 103.

In operation S306, the time corrector 103 performs a Fourier transform on an acquired speech signal to acquire speech signal features (e.g., a time-frequency spectrum).

In operation S307, the time corrector 103 computes a correlation using the phase of the spectrum (generalized cross-correlation phase transform; hereinafter referred to as "GCC-PHAT").

In operation S308, the time corrector 103 finds a point (offset) showing the greatest correlation in the GCC-PHAT and then compensates for the time delay of arrival occurring between two signals using the corresponding information. That is, the time corrector 103 corrects a time difference occurring between user terminals through phase-based cross-correlation.

In operation S309, the time corrector 103 transmits the corrected speech signal to the controller 102. The controller 102 stores the corrected speech signal in a speech signal buffer in the server.

The time-delay-of-arrival compensation method using the GCC-PHAT is one of the time correction methods that the time corrector 103 may use. In the present invention, a time correction method that the time corrector 103 uses is not limited thereto, and there may be various methods.

Figure 6:
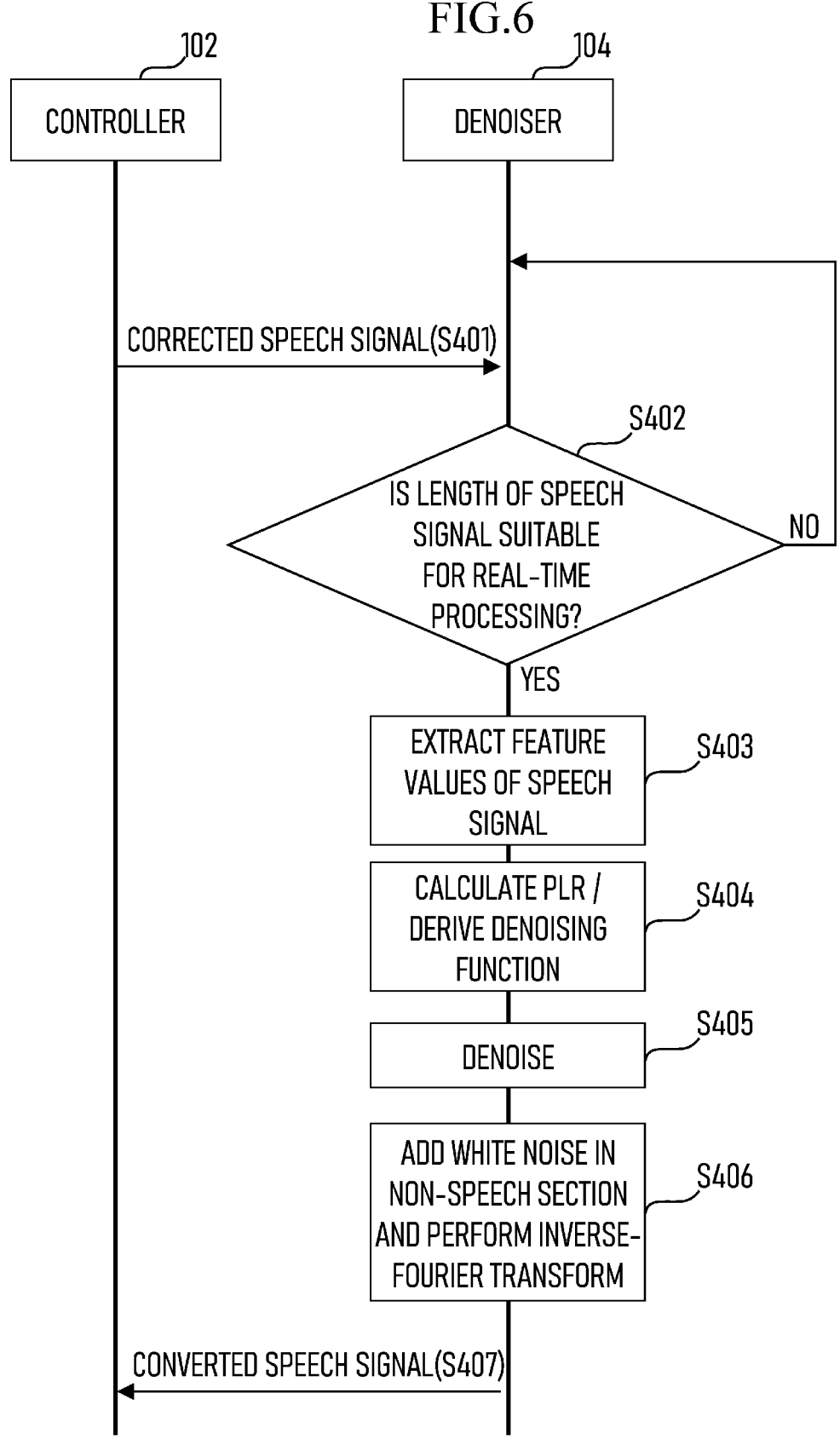
FIG. 6 is a flowchart illustrating a method in which an automatic speech translation server removes noise in a user's surrounding environment.

FIG. 6 is a flowchart illustrating a method in which an automatic speech translation server 100 removes noise in a user's surrounding environment. The denoiser 104 removes noise through an energy ratio-based algorithm for speech signals. The energy ratio-based algorithm is an algorithm for removing noise by deriving a ratio from the power spectral density of two speech signals and by defining and applying a denoising function.

In operation S401, the controller 102 transmits a speech signal to the denoiser 104. That is, the speech signal transmitted from the controller 102 to the denoiser 104 is a speech signal of which a delay time of arrival is corrected using the time corrector 103. The reason the time delay correction is performed before denoising is that accurate time correction may not be performed after denoising because the denoising distorts raw speech signal data. Also, PLR and PLD are most reliable when all users' voice signals represent the same time.

Although not shown in FIG. 6, a denoising function (gain function) defined in the denoising process of the denoiser 104 has an adjustable parameter. The parameter of the denoising function used in an embodiment of the present invention is not limited to values exemplified in an embodiment of the present invention.

In operation S402, the denoiser 104 checks whether an input speech signal has a length suitable for real-time speech processing (e.g., 0.1 seconds) and receives another speech signal when the input speech signal does not have the length suitable for real-time speech processing.

In operation S403, the denoiser 104 extracts a feature value (e.g., spectrum) for an input speech signal using a Fourier transform.

In operation S404, the denoiser 104 calculates a PLR and derives a denoising function (gain function) using the PLR.

In operation S405, the denoiser 104 acquires a denoised speech spectrum using the denoising function and the speech spectrum.

Operation S406 is an operation of adding white noise to a non-speech section and performing conversion into a speech signal using an inverse Fourier transform and overlap-and-add. The denoiser 104 adds white noise to the denoised speech signal feature and performs conversion into a speech signal using the inverse Fourier transform and overlap-and-add.

Although not shown in FIG. 6, the addition of white noise during the denoising process performed by the denoiser 104 is to induce the automatic speech detector 105 to clearly distinguish speech by adding weaker white noise to a stronger speech section signal remaining after the denoising and adding stronger white noise to a weaker speech section signal. White noise is added regardless of a non-speech section and a speech section, but it is important to add white noise to the non-speech section for the purpose of speech identification.

There may be various methods for the denoiser 104 to induce the automatic speech detector 105 to reliably identify speech. The method proposed in operation S406 is just one of the embodiments of the present invention, and the present invention is not limited thereto.

In operation S407, the denoiser 104 transmits a denoised speech signal (converted speech signal) to the controller 102.

Figure 7:
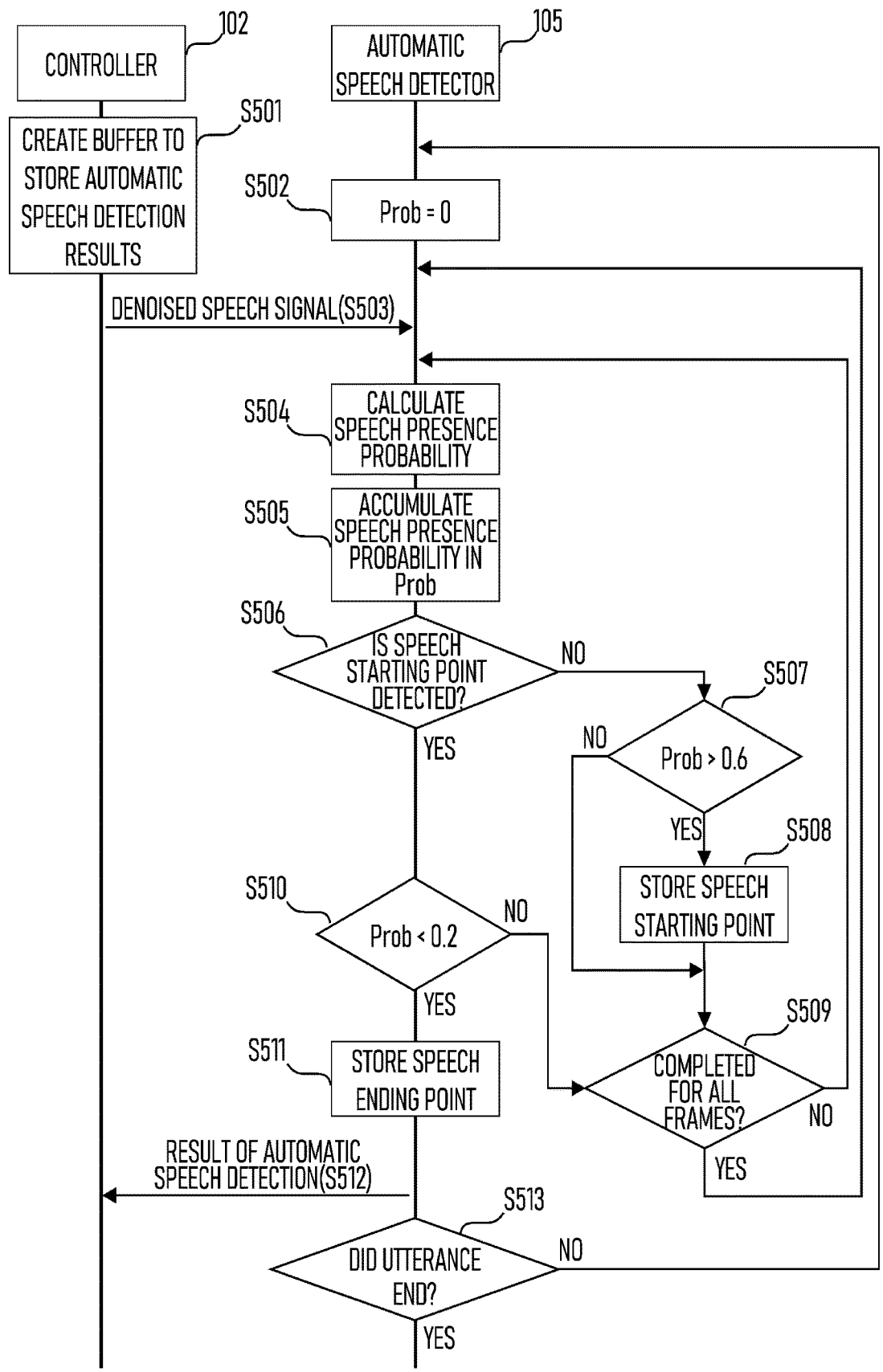
FIG. 7 is a flowchart illustrating a method in which an automatic speech translation server automatically detects an actual utterance section of an input speech signal according to an embodiment of the present invention.

FIG. 7 is a flowchart illustrating a method in which an automatic speech translation server 100 automatically detects an actual utterance section of an input speech signal according to an embodiment of the present invention. An automatic speech detector 105 detects a section having an actual utterance in speech uttered by a speaker in a source language.

In operation S501, a controller 102 creates a buffer to store an automatic speech detection result. The buffer is a temporary storage space for the controller 102 to sequentially input speech detection results into a speech recognizer 109.

In operation S502, the automatic speech detector 105 initializes a Prob value (probability value) to zero. Prob is a parameter for accumulatively calculating a speech presence probability for each frame in order to automatically detect a speech section. Examples of the accumulative calculation method may include a simple moving average, a cumulative moving average, a weighted moving average, and an exponential moving average, but the present invention is not limited thereto.

In operation S503, the controller 102 transmits a denoised speech signal to the automatic speech detector 105. In this case, the length of the speech signal transmitted to the automatic speech detector 105 is set to a length suitable for real-time processing (e.g., 0.1 seconds). In this embodiment, the method of automatically detecting speech in units of 0.1 seconds is illustrated, but the present invention is not limited thereto.

In operation S504, the automatic speech detector 105 inputs a received speech signal frame by frame to a pre-trained machine learning-based speech detection model and calculates a speech presence probability. The machine learning-based speech detection model may be implemented by an energy-based speech detection engine, an engine pre-trained with a neural network, etc., but the present invention is not limited thereto.

In operation S505, the automatic speech detector 105 accumulates the speech presence probability in the Prob value.

In operation S506, the automatic speech detector 105 checks whether the speech starting point is detected. When the speech starting point is not detected, the processing proceeds with operation S507 in order to detect the speech starting point. When the speech starting point is detected, the processing proceeds with operation S510 in order to detect a speech ending point.

In operation S507, the automatic speech detector 105 determines whether the Prob value is greater than a set speech starting point threshold (e.g., 60% or 80%). When the Prob value becomes greater than the speech starting point threshold, the processing proceeds with operation S508. In operation S508, when the Prob value is greater than the speech starting point threshold, the automatic speech detector 105 records (stores) the speech starting point, and the processing proceeds with operation S509. That is, the speech starting point is recorded based on when the Prob value becomes greater than the speech starting point threshold. When the Prob value is smaller than or equal to the set speech starting point threshold, the processing proceeds with operation S509.

In operation S509, when speech presence probabilities for all the frames are calculated from a speech signal previously received by the controller 102, the automatic speech detector 105 performs operation S503. Otherwise, the automatic speech detector 105 performs operation S504 in order to calculate and accumulate speech presence probabilities for subsequent frames.

In operation S510, the automatic speech detector 105 determines whether the Prob value is smaller than a set speech ending point threshold (e.g., 20% or 40%). When the Prob value is smaller than the set speech ending point threshold, the automatic speech detector 105 performs operation S511. When the Prob value is greater than or equal to the set speech ending point threshold, the automatic speech detector 105 performs operation S509.

In operation S511, the automatic speech detector 105 records the speech ending point on the basis of when the Prob value becomes smaller than the speech ending point threshold.

The speech starting point threshold and the speech ending point threshold are not limited to the values exemplified in FIG. 7 and the description with reference to FIG. 7 and may have values different from the exemplified values.

Although not shown in FIG. 7, even when the Prob value becomes smaller than the predetermined speech ending point threshold, the automatic speech detector 105 may record the point as a checkpoint instead of directly recording the point as a speech ending point. In this case, the automatic speech detector 105 detects a speech ending point by checking whether an utterance has ended for a certain period of time (e.g., 20 frames) after the checkpoint has ended. As the method of checking whether the utterance has ended, a method of checking whether speech is detected for a certain time of period, a method of checking whether there is a prolonged silence, or the like may be used, but the present invention is not limited thereto.

Although not shown in FIG. 7, the above-described speech detection model uses a method of using a model pre-trained with machine learning, but the present invention is not limited thereto. Various types of speech detection models may be applied to the automatic speech detector 105 according to future performance improvement.

In operation S512, when the automatic speech detector 105 transmits, to the controller 102, a result obtained by detecting a starting point and an ending point of speech from the speech signal, the controller 102 stores an automatic speech detection result in the buffer.

Operation S513 is an operation of determining whether the utterance has ended. The automatic speech detector 105 checks whether there is an incoming speech. If there is speech to be additionally transmitted, the Prob value is initialized to zero again (S502) to perform automatic speech detection.

According to the method presented with reference to FIG. 7, the automatic speech detector 105 automatically determines a speech section even when a user does not touch a screen or click a button. Thus, it is possible to eliminate the inconvenience caused by an unnecessary screen touch and button click and have a natural conversation.

Figure 8:
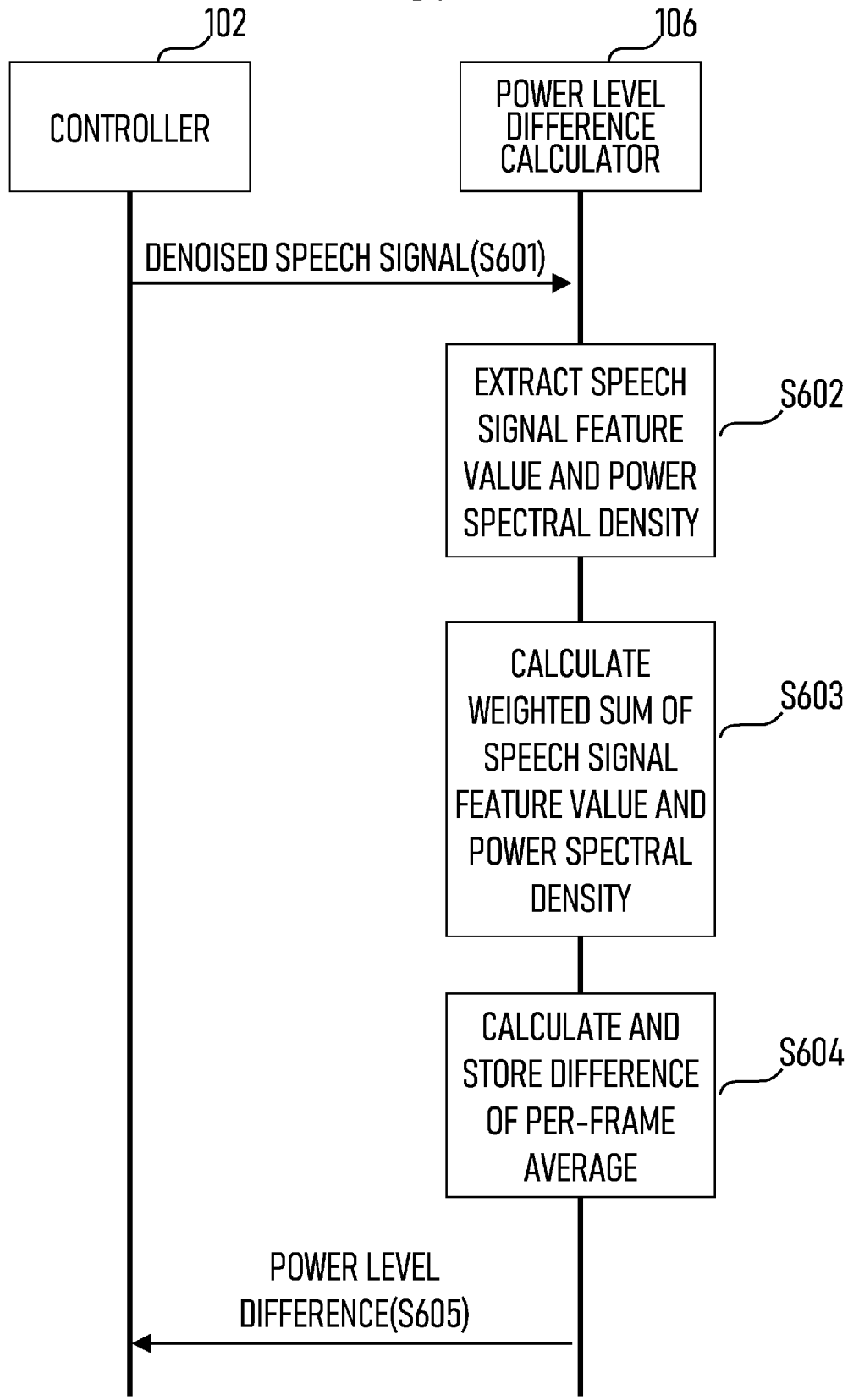
FIG. 8 is a flowchart illustrating a method of calculating a power level difference of an automatic speech translation server according to an embodiment of the present invention.

FIG. 8 is a flowchart illustrating a method of calculating a difference in power level of an automatic speech translation server 100 according to an embodiment of the present invention.

In operation S601, a controller 102 transmits a denoised speech signal to a power level difference calculator 106.

Although not shown in FIG. 8, the automatic speech detector 105 and the power level difference calculator 106 receive a speech signal of a length suitable for real-time processing from the controller 102, as described above. The automatic speech detector 105 and the power level difference calculator 106 receive the same speech signal (a speech signal from which noise is removed and to which white noise is added).

In operation S602, the power level difference calculator 106 extracts speech signal feature values and power spectral density from the denoised speech signal.

In operation S603, the power level difference calculator 106 calculates the weighted sum of the speech signal feature values and the power spectral density and stores the weighted sum in the buffer.

In operation S604, the power level difference calculator 106 calculates a difference in a per-frame average using the weighted sum stored in the buffer and then stores the difference in the buffer.

Although not shown in FIG. 8, when the absolute value of the power level difference is smaller than a predetermined threshold (e.g., 0.1), the controller 102 records a corresponding section as a noise section in which only noise is input because no user makes an utterance. Also, the automatic speech translation server 100 may acquire terminal information of a user who actually makes an utterance using a difference in power level because, among the power levels of the multiple speech signals, the speaker's speech is input to the speaker terminal 200 at the highest level and is input to the counterpart terminal 300 at a relatively low level.

In operation S605, the power level difference calculator 106 transmits the power level difference calculation result to the controller 102.

Figure 9:
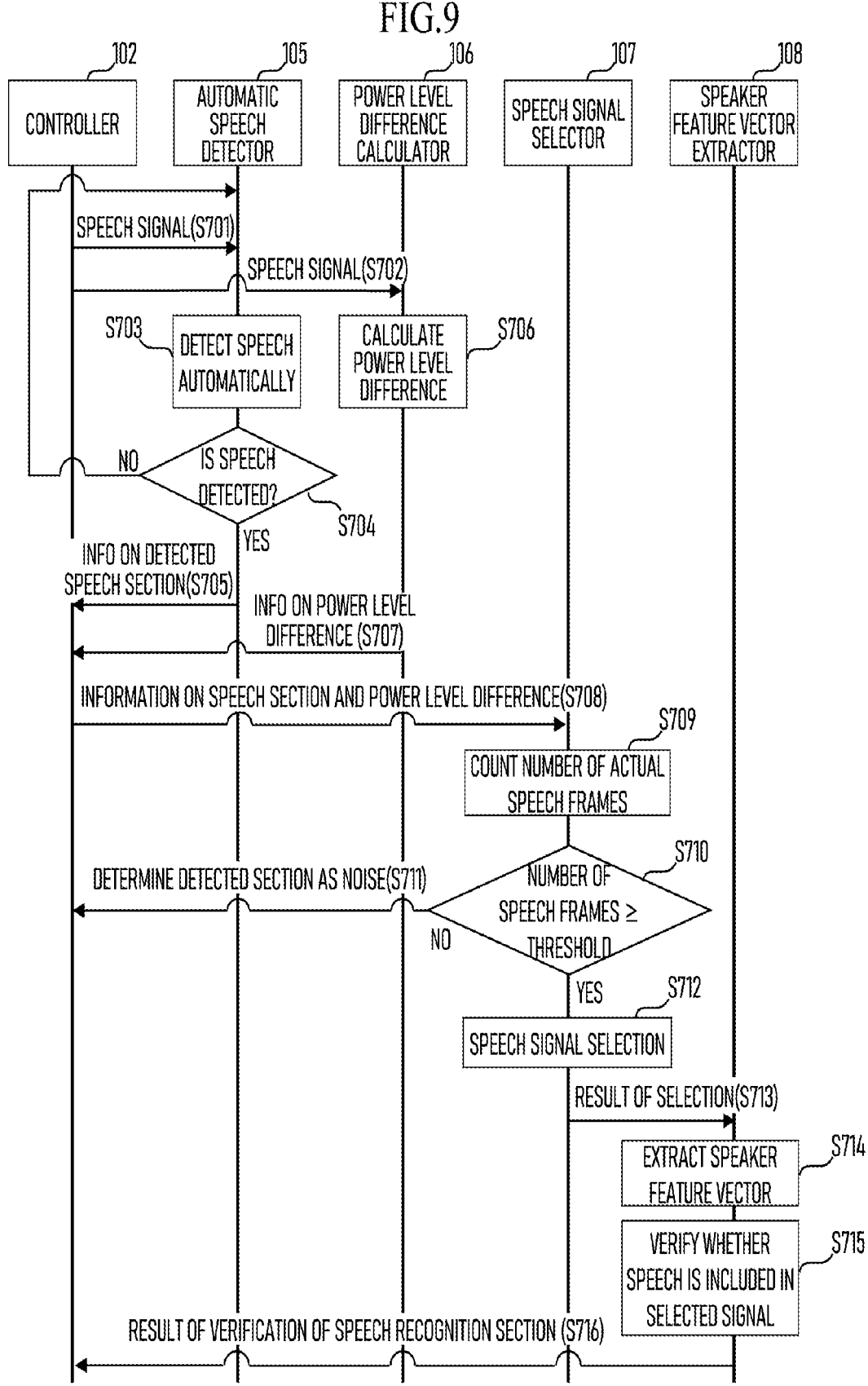
FIG. 9 is a flowchart illustrating a method of selecting a speaker's speech by an automatic speech translation server according to an embodiment of the present invention.

FIG. 9 is a flowchart illustrating a method of selecting a speaker's speech by an automatic speech translation server 100 according to an embodiment of the present invention. More specifically, FIG. 9 is a flowchart illustrating a method in which the automatic speech translation server 100 selects speech of a user who has actually made an utterance from among a plurality of users using the automatic speech detection result, the power level difference calculation result, and the speaker feature vector.

The automatic speech translation server 100 may use an automatic speech detector 105, a power level difference calculator 106, and a speaker feature vector extractor 108 in order to select speech signals.

In operations S701 and S702, the controller 102 transmits, to the automatic speech detector 105 and the power level difference calculator 106, a speech signal from which noise is removed and to which white noise is added as described above with reference to FIGS. 7 and 8. That is, operation S701 corresponds to operation S503, and operation S702 corresponds to operation S601.

The automatic speech detector 105 and the power level difference calculator 106 may operate in parallel. For example, the automatic speech detector 105 and the power level difference calculator 106 may operate simultaneously.

Operation S703 (automatic speech detection operation) includes operation S504 and operation S505 in the description with reference to FIG. 7. That is, operation S703 is an operation of calculating a speech presence probability from a denoised speech signal transmitted from the controller 102 and then accumulating a speech presence probability in a Prob value.

Also, operation S704 (speech detection determination operation) is an operation in which the automatic speech detector 105 performs the flowchart shown in FIG. 7. Operation S704 includes operations S506 to S509 in the description with reference to FIG. 7. That is, operation S704 is an operation in which the automatic speech detector 105 records a starting point and an ending point of speech. When the starting point or the ending point of the speech is not determined, the automatic speech detector 105 receives another speech signal from the controller 102 (S701). The details follow FIG. 7 and the description with reference to FIG. 7.

In operation S705, the automatic speech detector 105 transmits information on the detected speech section to the controller 102. Operation S705 corresponds to operation S510 of FIG. 7.

Operation S706 (power level difference calculation operation) is an operation in which the power level difference calculator 106 performs the flowchart shown in FIG. 8. Operation S706 includes operations S602 to S604. The details follow FIG. 8 and the description with reference to FIG. 8.

In operation S707, the power level difference calculator 106 transmits power level difference information to the controller 102. Operation S707 corresponds to operation S605 of FIG. 8.

In operation S708, the controller 102 transmits the results (the speech section information and the power level difference information) of the automatic speech detector 105 and the power level difference calculator 106 to a speech signal selector 107.

In operation S709, the speech signal selector 107 calculates the number of actual speech frames in the section using the speech section information and the power level difference information received from the automatic speech detector 105 and the power level difference calculator 106.

In operation S710, the speech signal selector 107 determines whether the number of speech frames is greater than or equal to a predetermined reference. If the number of speech frames is less than the predetermined reference, the speech signal selector 107 determines a corresponding section as noise for the reason that no real meaningful speech signals are included in the speech section. The speech signal selector 107 transmits a result of the determination to the controller 102 (S711). When the number of speech frames is greater than or equal to the predetermined reference, the speech signal selector 107 executes a speech signal determination (selection) algorithm (S712). The speech signal determination algorithm may be an algorithm for selecting a signal with the largest energy from among speech signals input to the speech signal selector 107 using the difference in power level between the input speech signals (an energy-based speech signal selection algorithm). The energy-based speech signal selection algorithm is an algorithm for extracting an energy value from each speech signal and selecting a speech signal to which an utterance is actually input from among the speech signals using a difference between the energy values.

Using the above-described method, it is possible to select one channel with the largest energy from among several channels input for one utterance in a crosstalk situation. In general, since an utterance is input to a speaker's speech input device at the highest level, the channel selected in the above method is the speaker's speech signal. Accordingly, it is possible to solve the crosstalk problem in the above method.

In operation S713, the speech signal selector 107 transmits a speech signal selection result to the speaker feature vector extractor 108.

In operations S714 and S715, the speaker feature vector extractor 108 extracts a speaker feature vector on the basis of the selected speech signal (S714) and verifies a conversation participant signal by performing comparison using similarity to a pre-registered speaker feature vector and filters out signals other than the conversation participant signal. Here, the speaker feature vector refers to a numerical vector of a certain dimension into which a speech signal in a given actual utterance section is converted.

In operation S716, the speaker feature vector extractor 108 transmits a verification result for the speech recognition section to the controller 102. The controller 102 stores speech signals selected and verified by the speech signal selector 107 and the speaker feature vector extractor 108 in the buffer in the automatic speech translation server 100 so that the speech signals may be sequentially input to the speech recognizer. In this case, it is common to store a raw speech signal from which noise is not removed and to which white noise is not added, but it is also possible to store a speech signal from which noise is removed and to which white noise is added depending on the utterance environment. For example, when a conversation is carried out in a very noisy place, a noise processing result may be stored in a buffer in the automatic speech translation server 100 and may be input to the speech recognizer.

FIG. 10 is a flowchart illustrating a method in which an automatic speech translation server 100 performs speech recognition and automatic speech translation and transmits a final result to a user terminal according to an embodiment of the present invention. Unlike FIG. 10, a speech recognizer 109 and an automatic translator 110 may be replaced with an end-to-end automatic speech translator that integrally performs voice recognition and automatic translation functions.

Although not shown in FIG. 10, a speech signal selected by a speech signal selector 107 is stored in a buffer in the automatic speech translation server 100.

In operation S801, a controller 102 transmits the selected speech signal to the speech recognizer 109.

In operation S802, the speech recognizer 109 performs speech recognition by inputting the selected speech signal to a pre-trained model.

In operation S803, the speech recognizer 109 transmits a speech recognition result to the automatic translator 110.

In operation S804, the automatic translator 110 translates the speech recognition result into a target language of a counterpart that is set for a counterpart terminal 300.

In operation S805, the automatic translator 110 transmits a translation result to the controller 102.

In operation S806, the controller 102 converts the translation result into a medium (e.g., subtitles or speech) that is easy for the user of the counterpart terminal 300 to understand. That is, the controller 102 creates a medium that is understandable by a counterpart user on the basis of the translation result. It is sufficient that the medium is a medium in which the counterpart user can grasp the intention of a speaker.

In operation S807, the controller 102 transmits the medium to a communication module 101. In another embodiment of the present invention, the controller 102 may deliver the translation result to the communication module 101, and the communication module 101 may transmit the translation result to the counterpart terminal 300.

In operation S808, the communication module 101 transmits the medium to the counterpart terminal 300. The counterpart user may check the medium using the counterpart terminal 300.

By repeating the above process until users end a conversation, a natural face-to-face conversation can be conducted between the users on the basis of a Zero UI-based automatic speech translation service.

For reference, the elements according to an embodiment of the present invention may be implemented as software or hardware such as a digital signal processor (DSP), a field-programmable gate array (FPGA) or an application-specific integrated circuit (ASIC) and may perform predetermined roles.

However, the elements are not limited to the software or hardware and may be configured to be in an addressable storage medium or configured to activate one or more processors.

Accordingly, as an example, the elements include elements such as software elements, object-oriented software elements, class elements, and task elements, processes, functions, attributes, procedures, subroutines, program code segments, drivers, firmware, microcode, circuits, data, database, data structures, tables, arrays, and variables.

Elements and functions provided by corresponding elements may be combined into a smaller number of elements or may be divided into additional elements.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus such that the instructions, which are executed via the processor of the computer or other programmable data processing apparatus, create means for implementing the functions specified in a flowchart block(s). These computer program instructions may also be stored in a computer-accessible or computer-readable memory that can direct a computer or other programmable data processing apparatus to function in a particular manner such that the instructions stored in the computer-accessible or computer-readable memory can also produce articles of manufacture embedding instruction means which implement the functions specified in the flowchart block(s). The computer program instructions may also be loaded onto a computer or other programmable data processing apparatus to cause a series of operations to be performed on the computer or other programmable data processing apparatus to produce a computer-implemented process such that the instructions, which are executed on the computer and other programmable data processing apparatus, can also provide operations for implementing the functions specified in the flowchart block(s).

Also, each block described herein may indicate a portion of a module, segment, or code including one or more executable instructions to execute a specific logical function(s). Moreover, it should be noted that the functions of the blocks may be performed in a different order in several modifications. For example, two successive blocks may be performed substantially at the same time, or they may be performed in reverse order according to their functions.

The automatic speech translation method, the automatic speech translation service provision method, the method of correcting a time difference between speech signals, the method of removing noise in a user's surrounding environment, the method of automatically detecting an actual utterance section from a speech signal, the power level difference calculation method, the speaker speech selection method, and the method of performing speech recognition and automatic translation to transmit a final result to a user terminal have been described with reference to the flowcharts shown in the drawings. For simplicity of description, the methods have been shown and described using a series of blocks, but the present invention is not limited to the sequence of the blocks, and some of the blocks may be performed in a different sequence from those shown and described herein or concurrently with the other blocks, and it is possible to implement various other branches, flow paths, and block sequences that achieve identical or similar results. Also, not all of the shown blocks are required for the implementation of the methods described herein.

According to an embodiment of the present invention, an automatic speech detector automatically determines a speech section, and thus a user does not need to directly determine a speech section through a terminal touch or a button click. That is, according to an embodiment of the present invention, it is possible to eliminate inconveniences in an automatic speech translation procedure, and it is also possible to enable natural conversations even between speakers who speak different languages.

Also, according to an embodiment of the present invention, it is possible to prevent a malfunction of a speech recognizer caused by a crosstalk phenomenon occurring in a short-distance conversation.

Effects of the invention are not limited to the aforementioned effects, and other effects that are not described herein should be clearly understood by those skilled in the art from the following description.

The configuration of the present invention has been described above in detail with reference to the accompanying drawings, but this is only an example. It will be appreciated that those skilled in the art can make various modifications and changes within the scope of the technical spirit of the present invention. Accordingly, the scope of the present invention is defined not by the detailed description but by the following claims, and all changes or modifications within the claims and their equivalents will be construed as being included in the technical scope of the present invention.

What is claimed is:

1. A Zero User Interface (UI)-based automatic speech translation system comprising:
   a speaker terminal configured to receive a target speech signal of a speaker;
   an automatic speech translation server configured to:
   receive multiple speech signals from multiple user terminals including the speaker terminal,
   select the target speech signal of the speaker among the multiple speech signals,
   translate the target speech signal of the speaker into a target language, and
   transmit the translated target speech signal to a counterpart terminal;
   and the counterpart terminal configured to output the translated target speech signal in a form of at least one of text or voice in the target language,
   wherein the automatic speech translation server:
   automatically detects a speech section having an actual utterance in each of the multiple speech signals,
   calculates a difference in a per-frame average energy value of each of the multiple speech signals,
   calculates a number of actual speech frames from the multiple speech signals on the basis of information on the speech section having the actual utterance and information on the difference in the per-frame average energy value, and
   selects the target speech signal of the speaker from the multiple speech signals according to an energy-based speech signal selection algorithm, wherein the energy-based speech signal selection algorithm comprises selecting a signal with the largest energy from among speech signals only when the number of actual speech frames is greater than or equal to a predetermined reference.

2. The Zero UI-based automatic speech translation system of claim 1, wherein the automatic speech translation server corrects a time difference occurring between the multiple speech signals through phase-based cross-correlation.

3. The Zero UI-based automatic speech translation system of claim 1, wherein the automatic speech translation server denoises, through an energy ratio (power level ratio)-based algorithm, the multiple speech signals received from the multiple user terminals.

4. The Zero UI-based automatic speech translation system of claim 1, wherein the automatic speech translation server detects the speech section having the actual utterance in the multiple speech signal using a neural network model, and
wherein the neural network model is trained to receive a speech signal and calculate a speech presence probability.

5. The Zero UI-based automatic speech translation system of claim 1, wherein the automatic speech translation server extracts a speaker feature vector on the basis of the target speech signal of the speaker, performs a comparison using similarity to a pre-registered speaker feature vector, and verifies the speaker.

6. A Zero User Interface (UI)-based automatic speech translation server comprising:
a communication module configured to receive multiple speech signals from user terminals connected to an automatic speech translation service;
a time corrector configured to correct a time difference occurring between the multiple speech signals through phase-based cross-correlation;
a denoiser configured to denoise the speech signals corrected through the phase-based cross-correlation through an energy ratio (power level ratio)-based algorithm;
an automatic speech detector configured to automatically detect a speech section having an actual utterance in each of the denoised speech signals;
a power level difference calculator configured to calculate a difference in a per-frame average energy value of each of the denoised speech signals;
a speech signal selector configured to select a speech signal of an actual speaker on the basis of the speech section having the actual utterance and the difference in the per-frame average energy value;
a speech recognizer configured to perform speech recognition on the speech signal of the actual speaker to acquire a speech recognition result; and
an automatic translator configured to perform translation on the speech recognition result to acquire a translation result;
wherein the speech signal selector calculates a number of actual speech frames from the denoised speech signals on the basis of information on the speech section having the actual utterance and information on the difference in the per-frame average energy value,
and selects the speech signal of the actual speaker from the denoised speech signals according to an energy-based speech signal selection algorithm, wherein the energy-based speech signal selection algorithm comprises selecting a signal with largest energy among speech signals only when the number of actual speech frames is greater than or equal to a predetermined reference,
wherein the communication module transmits the translation result to a terminal of a user who speaks a target language.

7. The Zero UI-based automatic speech translation server of claim 6, further comprising:
a speaker feature vector extractor configured to extract a speaker feature vector on the basis of the speech signal of the actual speaker, perform comparison using similarity to a pre-registered speaker feature vector, and verify the speaker.

8. The Zero UI-based automatic speech translation server of claim 6, wherein the time corrector derives cross-correlation using phase information that is acquirable when the multiple speech signals are expressed using a time-frequency spectrum.

9. The Zero UI-based automatic speech translation server of claim 6, wherein the denoiser derives a ratio from power spectral density of the multiple speech signals and denoises the corrected speech signal through a denoising algorithm by applying a gain function.

10. The Zero UI-based automatic speech translation server of claim 6, wherein
the automatic speech detector detects a section having an actual utterance in the denoised speech signal using a neural network model, and
the neural network model is trained to receive a speech signal and calculate a speech presence probability.

11. The Zero UI-based automatic speech translation server of claim 7, wherein the speaker feature vector is a vector of a certain dimension into which a speech signal of an utterance section is converted.

12. The Zero UI-based automatic speech translation server of claim 6, further comprising:
a controller configured to control components of the automatic speech translation server for the automatic speech translation server to perform an automatic speech translation process;
wherein the controller converts the translation result into at least one of text or voice in a target language, and
wherein the communication module transmits the result of the conversion of the controller to a terminal of a user who speaks a target language.

13. A Zero User Interface (UI)-based automatic speech translation method comprising operations of:
receiving multiple speech signals from user terminals that are offered automatic speech translation service;
a time difference correction operation for correcting a time difference between the multiple speech signals through a phase-based cross-correlation;
a denoising operation for denoising the corrected speech signals through an energy ratio-based algorithm;
an automatic utterance section detection operation for automatically detecting a speech section having an actual utterance in the denoised speech signals; and
an operation of calculating a difference in a per-frame average energy value of the denoised speech signals
an operation of selecting a speech signal of an actual speaker on the basis of the speech section having the actual utterance and the difference in the per-frame average energy value;
acquiring a speech recognition result for the speech signal of the actual speaker;
acquiring a result of translating the speech recognition result into a target language; and
transmitting the translation result to a user terminal of a target language,
wherein the operation of selecting the speech signal of the actual speaker is an operation of calculating a number of actual speech frames from the denoised speech signals on the basis of information on the speech section having the actual utterance and information on the difference in the per-frame average energy value
and selecting the speech signal of the actual speaker from the denoised speech signals according to an energy-based speech signal selection algorithm, wherein the energy-based speech signal selection algorithm comprises selecting a signal with largest energy from among speech signals only when the number of actual speech frames is greater than or equal to a predetermined reference.

14. The Zero UI-based automatic speech translation method of claim 13, further comprising, an operation of verifying whether the speech signal of the actual speaker is a target speaker's speech signal using a speaker feature vector.

15. The Zero UI-based automatic speech translation method of claim 13, wherein the time difference correction operation is an operation of deriving cross-correlation using phase information that is acquirable when the multiple speech signals are expressed using a time-frequency spectrum.

16. The Zero UI-based automatic speech translation method of claim 13, wherein the denoising operation is an operation of deriving a ratio from power spectral density of the multiple speech signals and denoising the corrected speech signals through a denoising algorithm by applying a gain function.

17. The Zero UI-based automatic speech translation method of claim 13, wherein the automatic utterance section detection operation is an operation of detecting a section having an actual utterance in the denoised speech signals using a neural network model trained to receive a speech signal and calculate a speech presence probability.

* * * * *